United States Patent
Li et al.

(10) Patent No.: US 12,552,486 B2
(45) Date of Patent: Feb. 17, 2026

(54) STRADDLE-TYPE VEHICLE

(71) Applicant: ZHEJIANG CFMOTO POWER CO., LTD, Zhejiang (CN)

(72) Inventors: Qianjin Li, Hangzhou (CN); Zhiyong Chen, Hangzhou (CN); An He, Hangzhou (CN); Ying Fang, Hangzhou (CN)

(73) Assignee: Zhejiang CFMOTO Power Co., Ltd., Hangzhou (CN)

( * ) Notice: Subject to any disclaimer, the term of this patent is extended or adjusted under 35 U.S.C. 154(b) by 377 days.

(21) Appl. No.: 17/599,416

(22) PCT Filed: Oct. 28, 2020

(86) PCT No.: PCT/CN2020/124543
§ 371 (c)(1),
(2) Date: Sep. 28, 2021

(87) PCT Pub. No.: WO2021/083240
PCT Pub. Date: May 6, 2021

(65) Prior Publication Data
US 2022/0250704 A1    Aug. 11, 2022

(30) Foreign Application Priority Data

Oct. 28, 2019   (CN) .......................... 201911029709.3

(51) Int. Cl.
*B62K 5/01*   (2013.01)
*B60K 5/04*   (2006.01)
(Continued)

(52) U.S. Cl.
CPC .................. *B62K 5/01* (2013.01); *B60K 5/04* (2013.01); *B60K 13/02* (2013.01); *B60K 13/04* (2013.01);
(Continued)

(58) Field of Classification Search
CPC .. B62K 5/01; B62K 11/04; B62J 43/20; B62J 40/00; B62J 35/00; B60K 5/04;
(Continued)

(56) References Cited

U.S. PATENT DOCUMENTS 4,650,025 A   3/1987   Igarashi et al.
4,673,052 A   6/1987   Shinozake et al.
(Continued)

FOREIGN PATENT DOCUMENTS

CA    2467537 A1    5/2003
CN    1108191 A  *  9/1995
(Continued)

OTHER PUBLICATIONS

The translation of Yagasaki (CN 1108191 A) relied upon in the office action is included for clarity of the record and compact prosecution. (Year: 1995).*

(Continued)

*Primary Examiner* — James A Shriver, II
*Assistant Examiner* — Nicholas R. Kandas
(74) *Attorney, Agent, or Firm* — Shewchuk IP Services, LLC; Jeffrey D. Shewchuk

(57) ABSTRACT

A straddle-type vehicle (100) includes a frame (20) and an engine (10) mounted on the frame (20). The engine (10) includes a cylinder head (11) positioned toward the rear end of the frame, and located below a saddle seat. The cylinder head faces toward the rear end of the frame, which allows the heated cylinder head of the engine and the exhaust pipe connected to the cylinder head to avoid the position where the user's legs contact the vehicle while riding, so the effect of heat emitted from the cylinder head on the rider's experience is reduced.

29 Claims, 13 Drawing Sheets

(51) Int. Cl.
  *B60K 13/02* (2006.01)
  *B60K 13/04* (2006.01)
  *B62J 35/00* (2006.01)
  *B62J 40/00* (2020.01)
  *B62J 43/20* (2020.01)
  *B62K 11/04* (2006.01)
  *B62M 9/04* (2006.01)
  *F01N 1/02* (2006.01)
  *F01N 3/28* (2006.01)
  *F02M 35/10* (2006.01)

(52) U.S. Cl.
  CPC .............. *B62J 35/00* (2013.01); *B62J 40/00* (2020.02); *B62J 43/20* (2020.02); *B62K 11/04* (2013.01); *B62M 9/04* (2013.01); *F01N 1/02* (2013.01); *F01N 3/2885* (2013.01); *F02M 35/10091* (2013.01)

(58) Field of Classification Search
  CPC .......... B60K 13/02; B60K 13/04; B62M 9/04; F01N 1/02; F01N 3/2885; F02M 35/10091
  See application file for complete search history.

(56) References Cited

U.S. PATENT DOCUMENTS

| | | | |
|---|---|---|---|
| 5,044,646 | A | 9/1991 | Iiga et al. |
| 6,040,266 | A | 3/2000 | Fay, III et al. |
| 6,626,260 | B2 | 9/2003 | Gagnon et al. |
| 7,377,552 | B2 | 5/2008 | Miyabe |
| 9,327,802 | B1 | 5/2016 | Chang et al. |
| 11,332,211 | B2 * | 5/2022 | Li |
| 2001/0027890 | A1 | 10/2001 | Bria et al. |
| 2002/0040822 | A1 | 4/2002 | Gagnon et al. |
| 2002/0088661 | A1 * | 7/2002 | Gagnon |
| 2002/0144852 | A1 | 10/2002 | Shimizu et al. |
| 2006/0254849 | A1 * | 11/2006 | Kalsnes |
| 2014/0116796 | A1 | 5/2014 | Poulin et al. |
| 2014/0262584 | A1 * | 9/2014 | Lovold |
| 2015/0300234 | A1 | 10/2015 | Hirukawa |
| 2018/0009500 | A1 | 1/2018 | Lovold et al. |

FOREIGN PATENT DOCUMENTS

| | | | | |
|---|---|---|---|---|
| CN | 101746474 | A | | 6/2010 |
| CN | 103184956 | A | | 7/2013 |
| CN | 104265414 | U | | 1/2015 |
| CN | 205047274 | U | | 2/2016 |
| CN | 207393290 | U | | 5/2018 |
| CN | 108825330 | A * | 11/2018 | ............... F01N 1/02 |
| CN | 209650472 | U | | 11/2019 |
| CN | 110588868 | A | | 12/2019 |
| CN | 210653498 | U | | 6/2020 |
| DE | 3006705 | A1 | | 10/1980 |
| DE | 19912466 | A1 | | 10/1999 |
| EP | 1031451 | A2 | | 8/2000 |
| JP | S59 162685 | U | | 11/1984 |
| JP | S61 117786 | | | 7/1986 |
| JP | 564 14491 | U | | 1/1989 |
| JP | 1989115795 | A | | 5/1989 |
| JP | 6306482 | B2 | | 4/2018 |
| TW | 1275512 | B | | 3/2007 |
| WO | 2020147417 | A1 | | 7/2020 |
| WO | 2020238112 | A1 | | 12/2020 |

OTHER PUBLICATIONS

European Patent Office, Supplementary Partial European Search Report in App. No. EP 20 88 1094, Jun. 17, 2022.

European Patent Office, Supplemental European Search Report, App. No. 23 16 2765, Jun. 21, 2023.

IP Australia, Examination Report No. 1 For Standard Patent Application, App. No. 2020373949 of Zhejiang CFMoto Power Co. Ltd, Nov. 18, 2021.

* cited by examiner

STRADDLE-TYPE VEHICLE

RELATED APPLICATION INFORMATION

The present application claims the benefits of priority to Chinese Patent Application No. 201911029709.3, filed with the Chinese Patent Office on Oct. 28, 2019. The entire contents of the above-referenced applications are incorporated herein by reference.

FIELD OF THE DISCLOSURE

The present application relates to a straddle-type vehicle.

BACKGROUND OF THE DISCLOSURE

The background discussion provided herein is intended to facilitate understanding of the technical content of the present application, and is not necessarily admitted prior art.

The English meaning of ATV is All-terrain vehicle, which is a means of transportation suitable for all terrain, and is abbreviated to ATV; ATVs may also be called "beach vehicles", and are also known as "all-terrain four-wheel off-road locomotives". The vehicle is simple and practical with good off-road performance. ATVs are equipped with wide tires to increase the area that the tires make contact with the ground, generating greater friction and reducing the pressure of the vehicle on the ground, making it easy to drive on beaches, riverbeds, woodland trails, streams and harsh desert terrain.

It is difficult to express the meaning of an all-terrain vehicle in a simple Chinese name. According to its appearance, it can be translated into "all-terrain four-wheel off-road locomotive", but such a translation still feels confusing. On soft sand, the ATV's wide tires can increase the area that the tires contact the ground, thereby generating greater friction, and unique tread patterns make spinning and skidding of the tires more difficult, making the vehicle easy to drive on the sand. But in fact, a good, high-performance ATV can not only be driven on beaches but also on riverbeds, woodland trails, streams and even on harsher desert terrain. ATVs are great for transporting people or goods, making the ATV a full function all-purpose vehicle of action.

Depending on the displacement size and the external characteristics of the vehicle, ATVs are commonly divided into:

Utility type, with its shape being square and upright a bit like a Willys Jeep (It's called "jeep type" in Taiwan), its most pronounced feature is to be provided with front and rear shelves or carriers; making the vehicle multi-functional and extremely practical. It can be used for carrying goods, farming, hunting, etc.

Sport type, with a streamlined appearance that is very sporty, which is suitable for high-speed driving, leaps, stunts, etc. ATV races are mainly based on sport type ATVs.

Military type, referring to a vehicle that can travel on any terrain. The most distinctive feature is that it can travel freely over terrain that is difficult for ordinary vehicles to be maneuvered. Classified by travelling mode, all-terrain vehicles have two types: wheeled and tracked. The military potential of ATVs has been recognized by more and more military forces, and its development is ascendant. The military type family is huge, with but a variety of models and novel styles.

At present, all-terrain vehicles are more and more popular among consumers. One style is the straddle type vehicle, which is generally equipped with a single-cylinder engine. The existing arrangement of the engine of the straddle type vehicle arranges the cylinder head of the engine near the front. This arrangement results in an exhaust pipe and tubular muffler running the whole length of the vehicle, which makes it hotter near the driver's body, especially near the legs, thus the driver's riding comfort is reduced.

In summary, how to improve the driver's comfort while driving a straddle vehicle has become a technical problem for those skilled in the art which urgently needs to be solved.

SUMMARY OF THE INVENTION

The purpose of the present application is to disclose a straddle-type vehicle with improves the driving comfort and driving experience of the driver.

In order to achieve the above purpose, the present application adopts the following technical solution: a straddle vehicle includes: a frame; a wheel assembly including front and rear wheels arranged under the frame; an engine mounted on the frame for providing power for the vehicle, the engine including a main body and a cylinder head connected to the main body and positioned above the main body; an intake and exhaust system, including an intake assembly for supplying air to the engine and an exhaust assembly for discharging exhaust gas generated by the engine; a brake system associated with the wheel assembly, including a parking assembly and a brake assembly; a transmission system installed on the frame for transmitting power from the engine to the wheel assembly; a fuel system arranged toward the front of the frame for providing fuel to the engine; and a saddle seat supported on the frame and located above the engine. The engine is oriented with its cylinder head positioned toward the rear of the frame. A projection of the cylinder head on a vertical plane where side walls of the front and rear wheels on the same side of the vehicle are positioned is located at the rear side of a projection of the midpoint of an imaginary line connecting centers of the front and rear wheels on the vertical plane, and the cylinder head is closer to the rear end of the frame.

Optionally, the fuel system includes a fuel tank located toward the front end of the frame.

Optionally, a projection of the center point of the fuel tank on the vertical plane where side walls of the front and rear wheels are positioned is located below a projection of the highest point of the cylinder head on the vertical plane.

Optionally, the intake assembly includes an air filter; an air intake pipe connected to the air filter for air to enter into the air filter, and an air outlet pipe matched with the air filter for the filtered air to enter into the cylinder head. The air filter is located above the fuel tank.

Optionally, the inlet of the air intake pipe faces toward the rear end of the frame.

Optionally, the exhaust assembly includes a tubular muffler mounted on the frame, inside of which is a catalyst for promoting redox of exhaust gas. An exhaust pipe is located between the tubular muffler and the cylinder head, one end of which is connected to the cylinder head, and the other end is connected to a middle portion of the tubular muffler.

Optionally, the tubular muffler defines a resonance cavity, an exhaust cavity, and an air intake cavity arranged between the resonance cavity and the exhaust cavity. The exhaust pipe is connected to the air intake cavity. Exhaust gas enters into the resonance cavity through the air intake cavity, and then flows into the exhaust cavity through an internal pipeline.

Optionally, a plurality of resonance tubes are provided inside of the resonance cavity. The side wall of each resonance tube defines a plurality of resonance holes for exhaust gas to enter into the resonance cavity.

Optionally, a portion of the internal pipe located in the resonance cavity defines a plurality of air holes for exhaust gas to enter into the pipe.

Optionally, the tubular muffler defines a partial pressure chamber adjacent to the resonance cavity. One end of the internal pipe is positioned in the partial pressure chamber, and exhaust gas enters into the internal pipe through a pipe port.

Optionally, the engine also includes a transmission arranged on one side of the main body of the engine. The straddle vehicle further includes a battery, and the frame is provided with a battery mounting position arranged on the side away from the transmission.

Optionally, the battery mounting position is a battery support plate arranged at a front lower position of the frame.

Optionally, the battery support plate defines at least one hole for heat dissipation.

Optionally, the frame includes an engine mounting position for supporting the engine, and the bottom of the main body is provided with an inclined shock absorber connected to the engine mounting position to form an inverted v-shaped support for the engine.

Optionally, the engine mounting position is a bottom plate arranged on the lower portion of the frame, and the bottom plate has at least one flat surface.

Optionally, a cross-section of the bottom plate is an inverted v-shaped structure.

Optionally, the bottom plate defines a plurality of holes.

Optionally, the parking assembly includes: a parking mechanism for braking the vehicle while parked, a handbrake cable connected to the parking mechanism, and a handle. One end of the handle is hinged to the frame, the handle being connected to the handbrake cable and arranged on one side of the frame.

The present application also discloses a straddle vehicle, including: a frame; a wheel assembly including front and rear wheels arranged under the frame; an engine mounted on the frame for providing power to the vehicle, which includes a main body and a cylinder head connected to the main body and positioned above the main body; an intake and exhaust system, including an intake assembly for supplying air to the engine and an exhaust assembly for discharging exhaust gas generated by the engine; a brake system associated with the wheel assembly, including a parking component and a brake component; a transmission system installed on the frame for transmitting power from the engine to the wheel assembly; a fuel system arranged at a front end of the frame for providing fuel to the engine; and a saddle seat supported on the frame and located above the engine. The engine is oriented with its cylinder head positioned toward the rear of the frame. A projection of the center of gravity of the vehicle on a vertical plane where side walls of the front and rear wheels on the same side of the vehicle are positioned is located further forward than a projection of the center of gravity of the engine on the vertical plane.

Optionally, the fuel system includes a fuel tank located toward the front end of the frame. A projection of a center of the fuel tank on a vertical plane is located further forward than a projection of the center of gravity of the vehicle on the vertical plane.

Optionally, the projection of the center point of the fuel tank on a vertical plane is located below a projection of the highest point of the cylinder head on the vertical plane.

Optionally, the intake assembly includes an air filter; an air intake pipe connected to the air filter for allowing air to enter into the air filter, and an air outlet pipe matched with the air filter for the filtered air to enter into the cylinder head. The air filter is located above the fuel tank.

Optionally, the inlet of the air intake pipe faces toward the rear end of the frame.

Optionally, the exhaust assembly includes a tubular muffler mounted on the frame, inside of which is a catalyst for promoting redox of exhaust gas. An exhaust pipe is located between the tubular muffler and the cylinder head, one end of which is connected to the cylinder head, and the other end is connected to a middle portion of the tubular muffler.

Optionally, the tubular muffler defines a resonance cavity, an exhaust cavity, and an air intake cavity arranged between the resonance cavity and the exhaust cavity. The exhaust pipe is connected to the air intake cavity. Exhaust gas enters into the resonance cavity through the air intake cavity, and then flows into the exhaust cavity through an internal pipe.

Optionally, a plurality of resonance tubes are provided inside of the resonance cavity. The side wall of each resonance tube defines a plurality of resonance holes for exhaust gas to enter into the resonance cavity.

Optionally, a portion of the internal pipe located in the resonance cavity defines a plurality of air holes for the exhaust gas to enter into the pipe.

Optionally, the tubular muffler defines a partial pressure chamber adjacent to the resonance cavity. One end of the internal pipe is positioned in the partial pressure chamber, and exhaust gas enters into the pipe through a pipe port.

Optionally, the straddle vehicle further includes a battery. The frame includes a battery mounting position arranged on the side away from the transmission.

Optionally, the battery mounting position is a battery support plate arranged at a front lower position of the frame.

Optionally, the battery support plate defines at least one hole for heat dissipation.

Optionally, the frame includes an engine mounting position for supporting the engine, and the bottom of the main body is provided with an inclined shock absorber connected to the engine mounting position to form an inverted v-shaped support for the engine.

Optionally, the engine mounting position is a bottom plate arranged on the lower portion of the frame, and the bottom plate has at least one flat surface.

Optionally, a cross-section of the bottom plate is an inverted v-shaped structure.

Optionally, the bottom plate defines a plurality of holes.

Optionally, the parking assembly includes: a parking mechanism for braking the vehicle while parked, a handbrake cable connected to the parking mechanism and a handle. One end of the handle is hinged to the frame, the handle being connected to the handbrake cable and arranged on one side of the frame.

The present application also discloses a straddle vehicle, including: a frame; a wheel assembly including front and rear wheels arranged under the frame; an engine mounted on the frame for providing power to the vehicle, the engine including a main body and a cylinder head connected to the main body and positioned above the main body; an intake and exhaust system, including an intake assembly for supplying air to the engine and an exhaust assembly for discharging exhaust gas generated by the engine; a brake system associated with the wheel assembly, including a parking assembly and a brake assembly; a transmission system installed on the frame for transmitting power from the engine to the wheel assembly; a fuel system arranged toward the front of the frame for providing fuel to the engine; and a saddle seat supported on the frame and located above the engine. A center line of the vehicle is defined along the length direction of the vehicle. A projection of the cylinder head on an imaginary plane including center lines of the two front wheels and the two rear wheels of the vehicle is located above a projection of the center line of vehicle on the imaginary plane.

Optionally, the fuel system includes a fuel tank, a fuel pipe used for conveying fuel from the fuel tank to the engine, and a fuel pump for pumping fuel from the fuel tank to the fuel pipe. The fuel tank is located toward the front end of the frame.

Optionally, a projection of the center point of the fuel tank on a vertical plane where side walls of the front and rear wheels are positioned is located below a projection of the highest point of the cylinder head on the vertical plane.

Optionally, the intake assembly includes an air filter; an air intake pipe connected to the air filter for air to enter into the air filter, and an air outlet pipe matched with the air filter for the filtered air to enter into the cylinder head. The air filter is located above the fuel tank.

Optionally, the inlet of the air intake pipe faces toward the rear end of the frame.

Optionally, the exhaust assembly includes: a tubular muffler mounted on the frame, inside of which is a catalyst for promoting redox of exhaust gas. An exhaust pipe is located between the tubular muffler and the cylinder head, one end of which is connected to the cylinder head, and the other end is connected to a middle portion of the tubular muffler.

Optionally, the tubular muffler defines a resonance cavity, an exhaust cavity, and an air intake cavity arranged between the resonance cavity and the exhaust cavity. The exhaust pipe is connected to the air intake cavity. Exhaust gas enters into the resonance cavity through the air intake cavity, and then flows into the exhaust cavity through an internal pipe.

Optionally, a plurality of resonance tubes are provided. A side wall of each resonance tube defines a plurality of resonance holes for exhaust gas to enter into the resonance cavity.

Optionally, a portion of the internal pipe located in the resonance cavity defines a plurality of air holes for exhaust gas to enter into the pipe.

Optionally, the tubular muffler defines a partial pressure chamber adjacent to the resonance cavity. One end of the internal pipe is positioned in the partial pressure chamber, and exhaust gas enters into the internal pipe through a pipe port.

Optionally, the frame includes a battery mounting position arranged on the side away from the transmission.

Optionally, the battery mounting position is a battery support plate arranged at a front lower position of the frame.

Optionally, the battery support plate defines at least one hole for heat dissipation.

Optionally, the frame includes an engine mounting position for supporting the engine, and the bottom of the main body is provided with an inclined shock absorber connected to the engine mounting position to form an inverted v-shaped support for the engine.

Optionally, the engine mounting position is a bottom plate arranged on the lower portion of the frame, and the bottom plate has at least one flat surface.

Optionally, a cross-section of the bottom plate is an inverted v-shaped structure.

Optionally, the bottom plate defines a plurality of holes.

Optionally, the parking assembly includes: a parking mechanism for braking the vehicle while parked, a handbrake cable connected to the parking mechanism, and a handle. One end of the handle is hinged to the frame, the handle being connected to the handbrake cable and arranged on one side of the frame.

The present application also discloses a straddle vehicle including an engine mounted on a frame, wherein, the side of the cylinder head of the engine is closer to the rear end of the frame than to the front end of the frame, and the connecting port on the cylinder head for connecting the exhaust pipe faces toward the rear end of the frame.

Optionally, the exhaust pipe is provided with a tubular muffler including an air inlet and an air outlet, with the air inlet being located in the middle of a circumferential wall of the tubular muffler.

Optionally, the air outlet is arranged at a rear lower end of the circumferential wall of the tubular muffler.

Optionally, the tubular muffler includes a tubular body. A middle portion of the tubular body defines an air intake chamber directly connected to the air inlet. The tubular body defines a front muffling chamber at the front end of the air intake chamber and a rear muffling chamber at the back end of the air intake chamber. The air intake chamber communicates with the front muffling chamber, the front muffling chamber communicates with the rear muffling chamber through a connecting pipe, and the air outlet communicates with the rear muffling chamber.

Optionally, an inner portion of both the front muffling chamber and the rear muffling chamber includes a porous structure for sound absorption.

Optionally, a connecting position for fixing the engine is arranged on the frame at a position corresponding to the bottom of the engine.

Optionally, the connecting position includes a front connecting position arranged nearer to the front end of the frame and a rear connecting position arranged nearer to the back end of the frame.

Optionally, a predetermined inclination angle is defined between a connection plane of the front connection position and/or the rear connection position and a bottom plane of the engine.

Optionally, the predetermined inclination angle is in the range from 15° to 45°.

Optionally, the straddle vehicle further includes: a wheel assembly, including front and rear wheels arranged under the frame; an intake and exhaust system, including an intake assembly for supplying air to the engine and an exhaust assembly for discharging exhaust gas generated by the engine; a transmission system mounted on the frame for transmitting power from the engine to the wheel assembly; and a fuel system arranged toward the front end of the frame for providing fuel to the engine.

Optionally, a projection of the cylinder head on a vertical plane where side walls of the front and rear wheels on the same side of the vehicle are positioned is located at the rear side of a projection of a midpoint of an imaginary line connecting centers of the front and rear wheels on the vertical plane, and the cylinder head is closer to the rear end of the frame.

Optionally, the engine is oriented with its cylinder head positioned toward the rear of the frame, and a projection of the center of gravity of the vehicle on a vertical plane where side walls of the front and rear wheels on the same side of the vehicle are positioned is located further forward than a projection of the center of gravity of the engine on the vertical plane.

Optionally, a center line of the vehicle is defined along the length direction of the vehicle. A projection of the cylinder head on an imaginary plane including center lines of the two front wheels and the two rear wheels of the vehicle is located above a projection of the center line of vehicle on the imaginary plane.

Optionally, the cylinder head is positioned toward the rear end of the frame. Defining a horizontal distance between the center of the cylinder head and a front axle of the vehicle as $L_e$, and defining a horizontal distance between the center of the cylinder head and a rear axle of the vehicle as $L_f$, $L_e \geq L_f$, and more preferably $L_e \geq 2L_f$.

Optionally, the connecting port on the cylinder head for connecting the exhaust pipe faces toward the tubular muffler.

The present application also discloses a straddle vehicle, including: a frame; a wheel assembly including front and rear wheels arranged under the frame; an engine mounted on the frame for providing power to the vehicle, the engine including a main body and a cylinder head connected to the main body and positioned above the main body; an intake and exhaust system, including an intake assembly for supplying air to the engine and an exhaust assembly for discharging exhaust gas generated by the engine; a brake system associated with the wheel assembly, including a parking component and a brake component; a transmission system mounted on the frame for transmitting power from the engine to the wheel assembly; a fuel system arranged toward the front of the frame for providing fuel to the engine; and a saddle seat supported on the frame and located above the engine. The engine is oriented with its cylinder head positioned toward the rear of the frame. Defining a horizontal distance between a center of the cylinder head and a front axle of the vehicle as $L_e$, and defining a horizontal distance between the center of the cylinder head and a rear axle of the vehicle as $L_f$, $L_e \geq L_f$, and more preferably $L_e \geq 2L_f$.

Optionally, the fuel system includes a fuel tank located toward the front end of the frame.

Optionally, a projection of the center point of the fuel tank on the vertical plane where side walls of the front and rear wheels are positioned is located below a projection of the highest point of the cylinder head on that plane.

Optionally, the intake assembly includes an air filter; an air intake pipe connected to the air filter for air to enter into the air filter, and an air outlet pipe matched with the air filter for the filtered air to enter into the cylinder head. The air filter is located above the fuel tank.

Optionally, the inlet of the air intake pipe faces toward the rear end of the frame.

Optionally, the exhaust assembly includes a tubular muffler mounted on the frame, inside of which is a catalyst for promoting redox of exhaust gas. An exhaust pipe is located between the tubular muffler and the cylinder head, one end of which is connected to the cylinder head, and the other end is connected to a middle portion of the tubular muffler.

Optionally, the tubular muffler defines a resonance cavity, an exhaust cavity, and an air intake cavity arranged between the resonance cavity and the exhaust cavity. The exhaust pipe is connected to the air intake cavity. Exhaust gas enters into the resonance cavity through the air intake cavity, and then flows into the exhaust cavity through an internal pipe.

Optionally, a plurality of resonance tubes are provided inside of the resonance cavity. The side wall of each resonance tube defines a plurality of resonance holes for exhaust gas to enter into the resonance cavity.

Optionally, a portion of the internal pipe located in the resonance cavity defines a plurality of air holes for exhaust gas to enter into the pipe.

Optionally, the tubular muffler defines a partial pressure chamber adjacent to the resonance cavity. One end of the internal pipe is positioned in the partial pressure chamber, and exhaust gas enters into the internal pipe through a pipe port.

Optionally, the engine also includes a transmission arranged on one side of the main body. The straddle vehicle also includes a battery, and the frame is provided with a battery mounting position arranged on the side away from the transmission.

Optionally, the battery mounting position is a battery support plate arranged at a front lower portion of the frame.

Optionally, the battery support plate defines at least one hole for heat dissipation.

Optionally, the frame includes an engine mounting position for supporting the engine, and the bottom of the main body is provided with an inclined shock absorber connected to the engine mounting position to form an inverted v-shaped support for the engine.

Optionally, the engine mounting position is a bottom plate arranged on a lower portion of the frame, and the bottom plate has at least one flat surface.

Optionally, a cross-section of the bottom plate is an inverted v-shaped structure.

Optionally, the bottom plate defines a plurality of holes.

Optionally, the parking assembly includes: a parking mechanism for braking the vehicle while parked, a handbrake cable connected to the parking mechanism, and a handle. One end of the handle is hinged to the frame, the handle being connected to the handbrake cable and arranged on one side of the frame.

The present application also discloses a straddle vehicle, including: a frame; a wheel assembly including front and rear wheels arranged under the frame; an engine mounted on the frame for providing power to the vehicle, which includes a main body and a cylinder head connected to the main body and positioned above the main body; the cylinder head including an exhaust port for discharging exhaust gas; an intake and exhaust system, including an intake assembly for supplying air to the engine and an exhaust assembly for discharging exhaust gas generated by the engine; the exhaust assembly including an exhaust pipe connected to the cylinder head and a tubular muffler connected to the exhaust pipe; a brake system associated with the wheel assembly, including a parking assembly and a brake assembly; a transmission system mounted on the frame for transmitting power from the engine to the wheel assembly; a fuel system arranged at the front end of the frame for providing fuel to the engine; and a saddle seat supported on the frame and located above the engine. The engine is oriented with its cylinder head positioned toward the rear of the frame, and the opening direction of the exhaust port faces toward the tubular muffler.

Optionally, the fuel system includes a fuel tank located toward a front end of the frame.

Optionally, a projection of the center point of the fuel tank on the vertical plane where side walls of the front and rear wheels are positioned is located below a projection of the highest point of the cylinder head on that plane.

Optionally, the intake assembly includes an air filter, an air intake pipe connected to the air filter for air to enter into the air filter, and an air outlet pipe matched with the air filter for the filtered air to enter into the cylinder head. The air filter is located above the fuel tank.

Optionally, the inlet of the air intake pipe faces toward the rear end of the frame.

Optionally, one end of an exhaust pipe is connected to the cylinder head, and the other end is connected to a middle portion of the tubular muffler.

Optionally, the tubular muffler defines a resonance cavity, an exhaust cavity, and an air intake cavity arranged between the resonance cavity and the exhaust cavity. The exhaust pipe is connected to the air intake cavity. Exhaust gas enters into the resonance cavity through the air intake cavity, and then flows into the exhaust cavity through an internal pipe.

Optionally, a plurality of resonance tubes are provided inside of the resonance cavity. The side wall of each resonance tube defines a plurality of resonance holes for exhaust gas to enter into the resonance cavity.

Optionally, a portion of the internal pipe located in the resonance cavity defines a plurality of air holes for exhaust gas to enter into the pipe.

Optionally, the tubular muffler defines a partial pressure chamber adjacent to the resonance cavity. One end of the internal pipe is positioned in the partial pressure chamber, and exhaust gas enters into the internal pipe through a pipe port.

Optionally, the engine also includes a transmission arranged on one side of the main body of the engine. The straddle vehicle also includes a battery, and the frame is provided with a battery mounting position arranged on the side away from the transmission.

Optionally, the battery mounting position is a battery support plate arranged at a front lower portion of the frame.

Optionally, the battery support plate defines at least one hole for heat dissipation.

Optionally, the frame includes an engine mounting position for supporting the engine, and a bottom of the main body is provided with an inclined shock absorber connected to the engine mounting position to form an inverted v-shaped support for the engine.

Optionally, the engine mounting position is a bottom plate arranged on the lower portion of the frame, and the bottom plate has at least one flat surface.

Optionally, a cross-section of the bottom plate is an inverted v-shaped structure.

Optionally, the bottom plate defines a plurality of holes.

Optionally, the parking assembly includes: a parking mechanism for braking the vehicle while parked, a handbrake cable connected to the parking mechanism, and a handle. One end of the handle is hinged to the frame, the handle being connected to the handbrake cable and arranged on one side of the frame.

The present application also discloses a straddle vehicle, including: a frame; an engine for providing power to the vehicle, including a transmission, a main body and a cylinder head connected to the main body and positioned above the main body, the cylinder head including a cylinder head portion and a cylinder head cover; an intake and exhaust system including an intake assembly for providing air to the engine and an exhaust assembly for exhausting waste gas generated by the engine; the exhaust assembly including an exhaust pipe and a tubular muffler arranged at the rear end of the frame; a brake system including a parking component and a brake component; a transmission system mounted on the frame for transmitting engine power to the wheels; a fuel system arranged at the front end of the frame for providing fuel to the power system; and a saddle seat system supported on the frame and located above the engine. The opening direction of the exhaust channel on the cylinder cover faces toward the tubular muffler.

Optionally, the fuel system includes: a fuel tank arranged at the front end of the frame.

Optionally, a center point of the fuel tank is positioned below the cylinder cover.

Optionally, the intake assembly includes an air filter, an air intake pipe connected to the air filter for air to enter into the air filter, and an air outlet pipe matched with the air filter for the filtered air to enter into the cylinder head. The air filter is located above the fuel tank.

Optionally, the inlet of the air intake pipe faces toward the rear end of the frame.

Optionally, one end of the exhaust pipe is connected to the cylinder head, and the other end is connected to a middle portion of the tubular muffler.

Optionally, the tubular muffler defines a resonance cavity, an exhaust cavity, and an air intake cavity arranged between the resonance cavity and the exhaust cavity. The exhaust pipe is connected to the air intake cavity. Exhaust gas enters into the resonance cavity through the air intake cavity, and then flows into the exhaust cavity through an internal pipe.

Optionally, a plurality of resonance tubes are provided inside of the resonance cavity. The side wall of each resonance tube defines a plurality of resonance holes for exhaust gas to enter into the resonance cavity.

Optionally, a portion of the internal pipe located in the resonance cavity defines a plurality of air holes for exhaust gas to enter into the pipe.

Optionally, the tubular muffler defines a partial pressure chamber adjacent to the resonance cavity. One end of the internal pipe is positioned in the partial pressure chamber, and exhaust gas enters into the internal pipe through a pipe port.

Optionally, the frame is provided with a battery mounting position arranged on the side away from the transmission.

Optionally, the battery mounting position is a battery support plate arranged at a front lower position of the frame.

Optionally, the battery support plate defines at least one hole for heat dissipation.

Optionally, the frame is provided with an engine mounting position for supporting the engine, and a bottom of the main body is provided with an inclined shock absorber connected to the engine mounting position to form an inverted v-shaped support for the engine. The engine mounting position is a bottom plate arranged on a lower portion of the frame, and the bottom plate has at least one flat surface. A cross-section of the bottom plate is an inverted v-shaped structure. The bottom plate defines a plurality of holes.

Optionally, the parking assembly includes: a parking mechanism for braking the vehicle while parked, a handbrake cable connected to the parking mechanism, and a handle. One end of the handle is hinged to a frame, the handle being connected to the handbrake cable and arranged on one side of the frame.

In summary, compared to the background technical introduction, the engine arrangement structure of the above-mentioned straddle-type vehicle includes the engine mounted on the frame. In the engine arrangement structure, the cylinder head is arranged on the side of the engine closer to the rear end of the frame, and the connecting port on the cylinder head for connecting to the exhaust pipe faces toward the rear end of the frame. By arranging the cylinder head on one side of the engine nearer to the rear end of the frame, and arranging the connection port on the cylinder head for connecting to the exhaust pipe to face toward the rear end of the frame, the exhaust pipe and the tubular muffler need not be run through the length of the vehicle, and the exhaust pipe does not pass through the riding position of the driver located in the middle of the frame, so the temperature of the riding position of the driver is significantly reduced, and driving comfort is improved.

In addition, the present application also provides a straddle-type vehicle, which includes an engine arrangement structure as described in any of the above solutions. As the engine arrangement structure of the above straddle-type vehicle has the above technical effects, the straddle vehicle with the above engine arrangement structure should also have the corresponding technical effects, which will not be repeated here.

In the present application, the position of the cylinder head is close to the rear wheel of the vehicle, which allows the heated cylinder head of the engine and the exhaust pipe connected to the cylinder head to further spaced from the position where the legs contact with the vehicle while the user is driving the vehicle, so the effect of heat emitted from the cylinder head on the rider's comfort is reduced.

DETAILED DESCRIPTION

Figure 1:
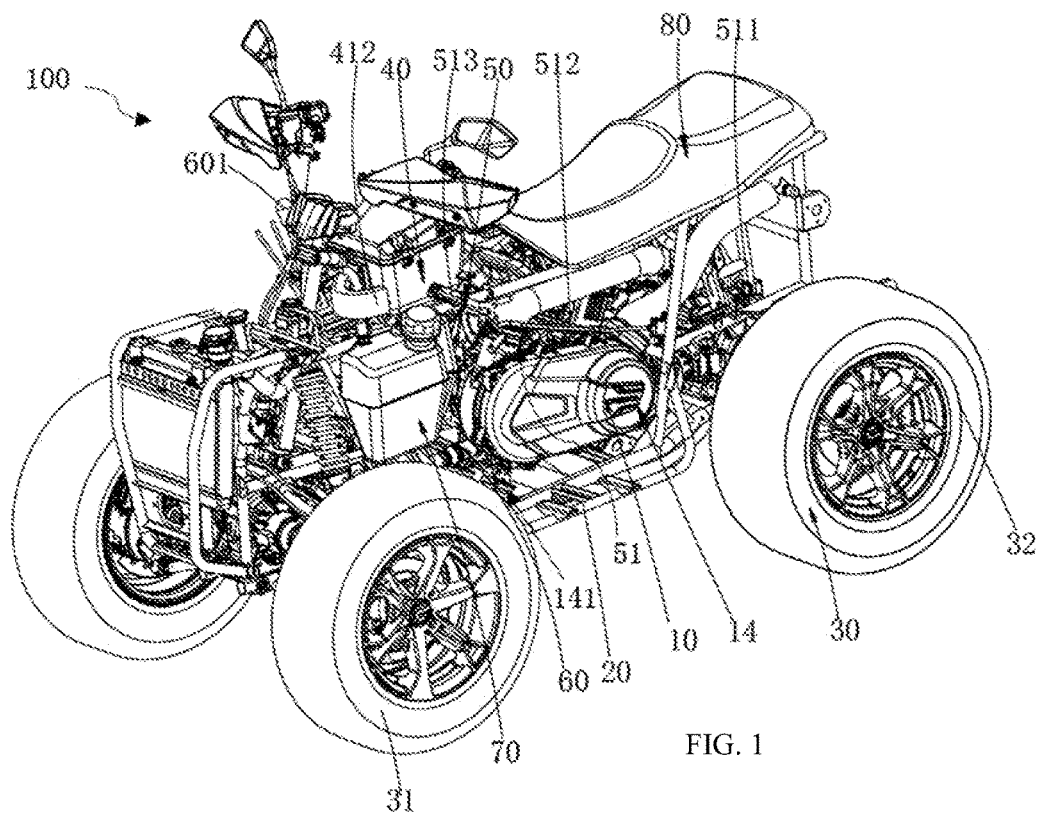
FIG. 1 is a perspective view of a straddle-type vehicle in an embodiment of the application.

In order to enable those skilled in the art to better understand the present invention, the technical solutions in the embodiments of the present application are clearly and completely described below in conjunction with the accompanying drawings of the embodiments of the present application, and the structure or the related technical terms used in the present application are further described below. Any technical terms in the following should be understood and interpreted in accordance with their general usage within the field unless otherwise specified.

Referring to FIGS. 1-2 and 11-14, a straddle-type vehicle 100 provided by an embodiment of the present application includes engine 10, a frame 20, a wheel assembly 30, an intake and exhaust system 40, a brake system 50, a transmission system 60, a fuel system 70, a saddle seat 80, and an electrical system 90. The engine 10 is arranged on the frame 20 for providing power to the whole vehicle. The frame 20 may be a metallic frame used for supporting the engine 10, the intake and exhaust system 40, the brake system 50, the transmission system 60, the fuel system 70, the saddle seat 80, and a plastic housing, etc. The wheel assembly 30 includes a front wheel 31 and a rear wheel 32 arranged below the frame 20. The intake and exhaust system 40 is connected to the engine 10. The brake system 50 is associated with the wheel assembly 30 for brake control. The transmission system 60 is mounted on the frame 20 and is able to transmit the power of engine 10 to the wheel assembly 30. The fuel system 70 is arranged at the front end of the frame to provide fuel to the engine 10. The saddle seat 80 is supported on the frame 20 and positioned above the engine 10.

Referring to FIGS. 1-4 and 11-14, in the present embodiment, the engine 10 includes an engine main body 14 and a cylinder head 11 connected to the main body 14 and located above the main body 14. The engine 10 is mounted on the frame 20 and located at a lower portion of the frame 20, thereby the center of gravity of the entire vehicle 100 is effectively lowered. Specifically, an engine mounting position is provided on the frame 20. The engine mounting position is composed of two bottom plates 201 with spacing which are arranged at the lower portion of the frame 20. The bottom plate 201 may be an inverted V-shaped structure defining a plurality of mounting holes 2011 for receiving bolts. Of course, it may also have other shapes, for example, an inclined flat plate, or a metal tube with an inclined plane. Four shock absorbers 141 are connected to the bottom of the engine body 14. The shock absorbers 141 can absorb the vibration of the engine 20 to improve the stability of the vehicle 100 and reduce noise. Two shock absorbers 141 are mounted on one of the bottom plates 201 and the other two shock absorbers 141 are mounted on the other bottom plate 201. The shock absorbers 141 are inclined with a predetermined angle in the range from 15° to 45°. Specifically, the shock absorber 141 includes an upper connecting plate 1411, a lower connecting plate 1412 and a shock-absorbing damping block 1413. The upper connecting plate 1411 is connected to a shaft at the bottom of the main body 14. The shock-absorbing damping block 1413 is arranged between the upper connecting plate 1411 and the lower connecting plate 1412. An upper end surface of the shock-absorbing damping block 1413 is glued or otherwise connected to the upper connecting plate 1411, and a bottom surface of the shock-absorbing damping block 1413 is glued or otherwise connected to the lower connecting plate 1412. There is no direct connection between the lower connecting plate 1412 and the upper connecting plate 1411. The lower connecting plate 1412 may be connected to a base plate 201 by bolts.

The engine 10 further includes a transmission 13 located on one side of the engine main body 11. In the present embodiment, the transmission 13 is a CVT transmission. It is understood that other types of transmissions can alternatively be used. After the engine 10 is mounted on the frame 20, the engine cylinder is non-vertically slanted with the cylinder head 11 facing toward the rear end of the frame 20. The cylinder head 11 is located below the saddle seat 80, which keeps the cylinder head 11 away from the rider's legs, and the heat emitted from the cylinder head 11 is insulated by the saddle seat 80. Therefore, the heat emitted from the cylinder head 11 is not transferred to the rider, which ensures the rider's comfort and also enhances the rider's safety while driving the vehicle 100.

As shown in FIGS. 1-4, the wheel assembly 30 includes a front wheel 31 adjacent to the front end of the frame 20 and a rear wheel 32 adjacent to the rear end of the frame 20. The front wheel 31 is connected to the transmission system 60 through the front axle 311, and the rear wheel 32 is connected to the transmission system 60 through the rear axle 321. A Cartesian coordinate system x-y is established parallel to a plane where side walls of the front wheel 31 and rear wheel 32 are positioned. Both the center of the front wheel 31 and the center of the rear wheel 32 are points on the axis x, and the midpoint of an imaginary line connecting the centers of the front wheel 31 and the rear wheel 32 defines the origin O of Cartesian coordinate system x-y. The projection of cylinder head 11 onto the plane of the Cartesian coordinate system is located in the first quadrant of the Cartesian coordinate system x-y; that is, the cylinder head 11 is located rearwardly from the midpoint of the imaginary line connecting the centers of the front wheel 31 and the rear wheel 32, and is therefore closer to the rear end of the frame 20 than to the front end of the frame 20.

Figure 9:
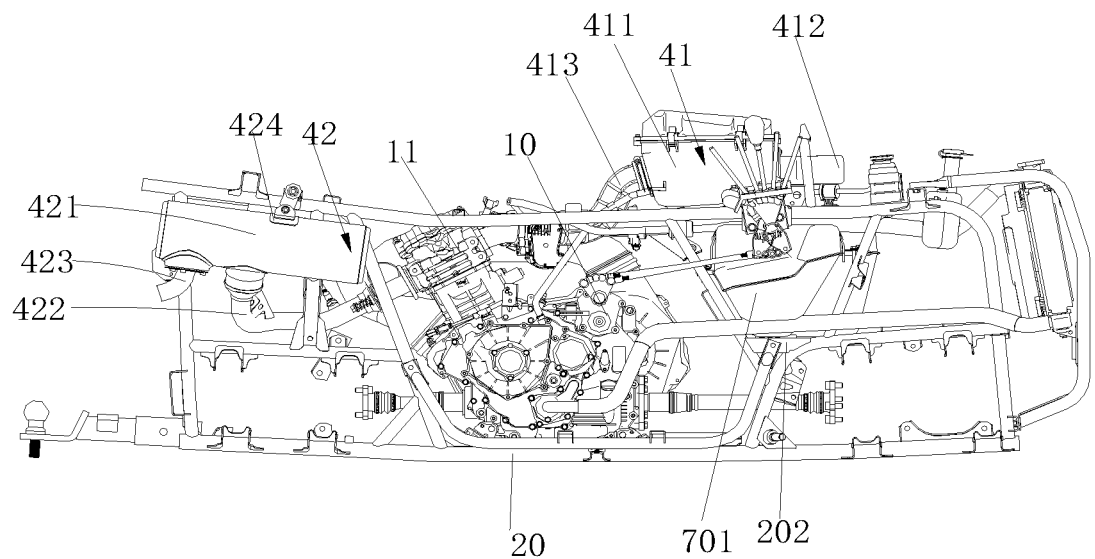
FIG. 9 is a schematic diagram of the structure of the engine, fuel system and intake and exhaust system on the frame in FIG. 1.
Figure 10:
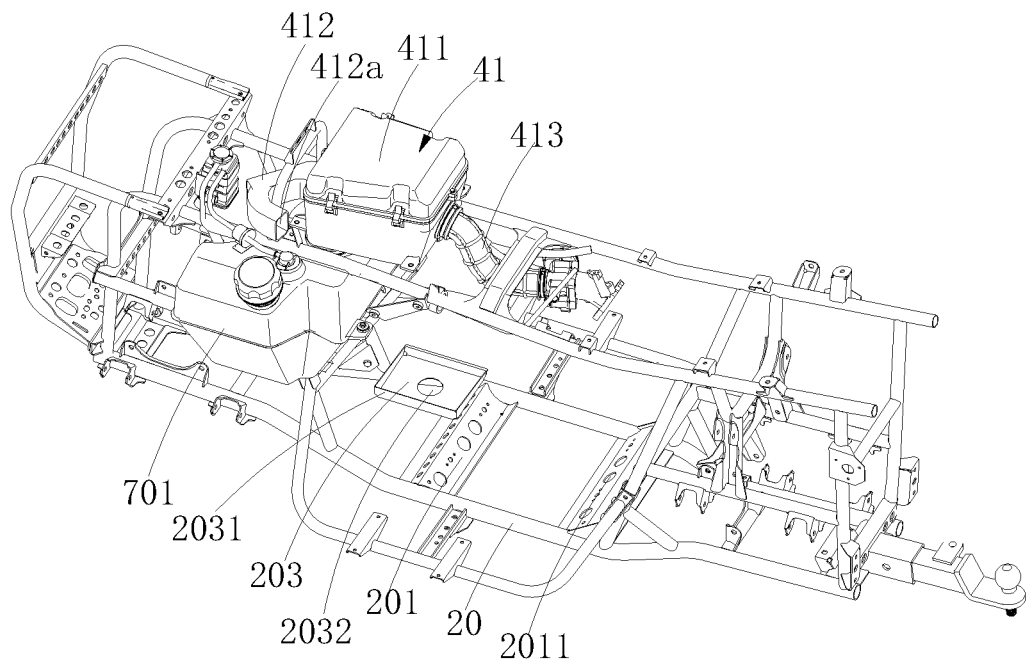
FIG. 10 is a perspective view of the fuel system and air intake assemblies on the frame in FIG. 9.

As shown in FIGS. 9-10, the fuel system 70 includes a fuel tank 701 mounted on the frame 20. The fuel tank 701 is a thin-walled tank with its fuel tank position on the front end of the frame 20, mounted by two spaced support bars 202 on the frame 20. The width between the two support bars 221 is suitable for supporting the fuel tank 701. The fuel tank 701 is positioned on the two support bars 221 and supported by the support bars 221 to fix the position of the fuel tank 701 on the frame 20 so the fuel tank 701 has high stability. The projection of the fuel tank 701 onto the plane of the Cartesian coordinate system x-y is located in the second quadrant of the Cartesian coordinate system x-y. As such, the fuel tank 701 is away from the cylinder head 11 and away from the heat source of the engine 10, resulting in less heating of the fuel tank 701 and increased safety of the fuel tank when mounted on the frame 20. The positioning keeps the fuel temperature in the fuel tank 701 low, resulting in less fuel volatilization. The projection of the center point of the fuel tank 701 on the plane of the Cartesian coordinate system is located below the projection of the highest point of the cylinder head 11 on the plane of the Cartesian coordinate system, nearer to the front end of the frame. The positioning results in a lower mounting height of the fuel tank 701 on the frame 20, thereby reducing the center of gravity of the whole vehicle, so the vehicle has high stability during turning of the vehicle.

Figure 11:
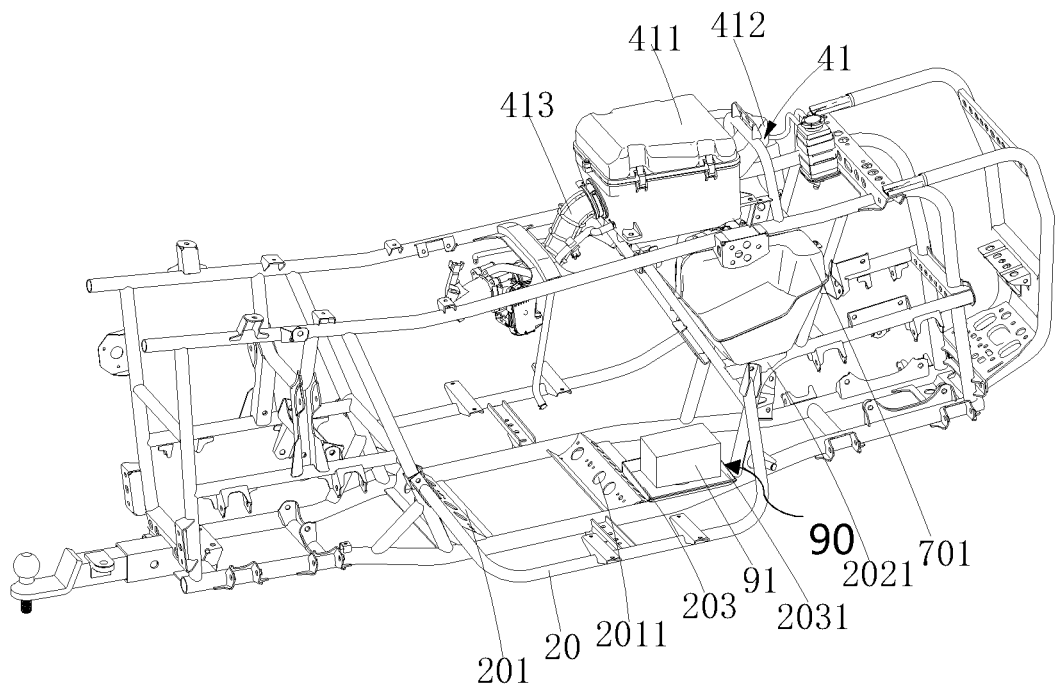
FIG. 11 is a structural schematic diagram of the fuel system and air intake assemblies if FIG. 9 from another angle on the frame.

As shown in FIGS. 9-11, the intake and exhaust system 40 includes an intake assembly 41 and an exhaust assembly 42. The intake assembly 41 is used to provide clean air to the engine 10 to maintain efficient combustion of fuel in the combustion chamber of the engine 10. The intake assembly 41 includes an air filter 411, an air intake pipe 412 and an air outlet pipe 413, wherein the air intake pipe 412 is connected to the air filter 411 to allow air to enter into the air filter 411 to filter out impurities in the air. The air outlet pipe 413 is connected to the engine 10, and the filtered air is transmitted to the engine 10 through the air outlet pipe 413, so as to provide oxygen for the fuel. In particular, the air filter 411 is located above the fuel tank 701 and fixed on the frame 20 by bolts. This positioning increases the mounting height of the air filter 411 on the vehicle, resulting in cleaner air entering into the air filter 411 and a longer service life of the air filter 411. At the same time, the air intake pipe 412 is arranged at the front end of the air filter 411, and the air intake pipe 412 is curved such that the inlet 412a of the air intake pipe 412 faces rearwardly. Orienting the inlet 412a rearwardly helps to prevent solid particles in the air from being passively poured into the air filter 411 during vehicle driving, and ensures that the air intake of the air filter 411 is reasonable.

As shown in FIGS. 15-18, the exhaust assembly 42 includes a tubular muffler 421 and an exhaust pipe 422 connected to the tubular muffler 421 and cylinder head 11. The tubular muffler 421 is arranged at the rear end of the frame 20. A connecting block 424 is provided on the tubular muffler 421. The connecting block 424 is a metal block closely attached to the outer wall of the tubular muffler 421 which indirectly connects the tubular muffler 421 to the frame 20. The tubular muffler 421 defines a resonance cavity 4212, an exhaust cavity 4213, an air intake cavity 4214 and a partial pressure chamber 4215. Exhaust gas enters the air intake cavity 4214 through the exhaust pipe 422, and then flows from the air intake cavity 4214 into the resonance cavity 4212. Exhaust gas is internally piped both from the resonance cavity 4212 and from the partial pressure chamber 4215 into the exhaust cavity 4213. The air intake cavity 4214 may be located in a middle portion of the tubular muffler 421. The volume of the air intake cavity 4214 is larger than any of the volumes of the resonance cavity 4212, the exhaust cavity 4213 or the partial pressure chamber 4215. A catalyst is provided within the air intake cavity 4214 for promoting exhaust gas redox. The exhaust pipe 422 is connected to the middle portion of the tubular muffler 421, that is, the exhaust pipe 422 is connected to the air intake cavity 4214. This positioning extends the length of the exhaust pipe 422, reduces the curvature of the exhaust pipe 422, and reduces the resistance of the exhaust flow. Further, the partial pressure chamber 4215 is located at the front of the tubular muffler 421, and the resonance cavity 4212 is located between the air intake cavity 4214 and the partial pressure chamber 4215. The exhaust cavity 4213 is located at the rear of the tubular muffler 421, with the exhaust cavity 4213 being adjacent to the air intake cavity 4214.

In particular, a plurality of resonance tubes 4216 with openings at both ends are arranged in the resonance cavity 4212, and the resonance tubes 4216 communicate with the air intake cavity 4214 and the partial pressure chamber 4215. A plurality of resonance holes 4217 are defined on the side wall of the resonance tube 4216. The exhaust gas in the air intake cavity 4214 flows in through one end of the resonance tube 4216, and then one portion of the exhaust gas flows into the resonance cavity 4212 through the resonance holes 4217, and the other portion of the exhaust gas flows into the partial pressure chamber 4215 through the other end of the resonance tube 4216. A pipe 4218 within the tubular muffler 421 connects the resonance cavity 4212 and the exhaust cavity 4213 and also connects the partial pressure chamber 4215 and the exhaust cavity 4213. The pipe 4218 has openings on both ends, and a plurality of air holes are arranged on the side wall of the portion of the pipe 4218 located in the resonance cavity 4212. The exhaust gas in the resonance cavity 4212 enters the pipe 4218 through the air holes, and then flows into the exhaust cavity 4213. One end of the pipe 4218 is positioned in the partial pressure chamber 4215. The exhaust gas in the partial pressure chamber 4215 flows into the pipe 4218 through one end of the pipe 4218, and flows into the exhaust cavity 4213 through the pipe 4218.

Further, the tubular muffler 421 is provided with a tail gas pipe 423 which is connected to the exhaust cavity 4213, and the exhaust gas entering the exhaust cavity 4213 is discharged into the outside air through the tail gas pipe 423. The position of the tail gas pipe 423 is preferably at a lower end of the circumferential wall of the tubular muffler 421. Specifically, the tail gas pipe 423 is curved, and the outlet for exhaust gas of the tail gas pipe 423 is inclined and aligned with the bottom plane of the lower end. One end where the tail gas pipe 423 is connected to the exhaust cavity 4213 is inserted into the exhaust cavity 4213 extends vertically within the exhaust cavity 4213.

Figure 12:
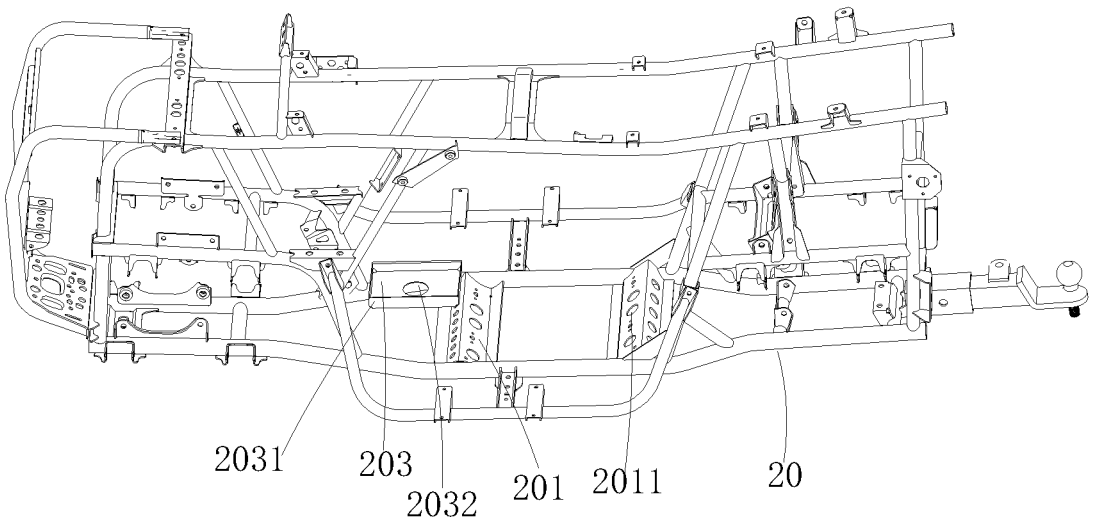
FIG. 12 is a perspective view of the structure of the frame system in FIG. 5.
Figure 13:
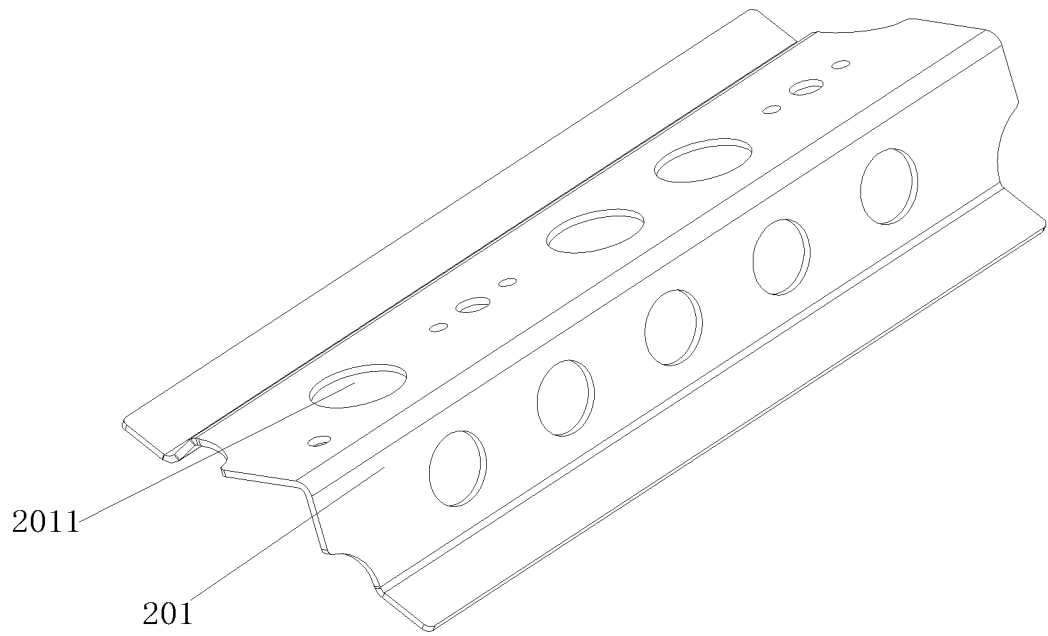
FIG. 13 is a schematic diagram of the structure of the bottom plate on the frame system in FIG. 12.
Figure 14:
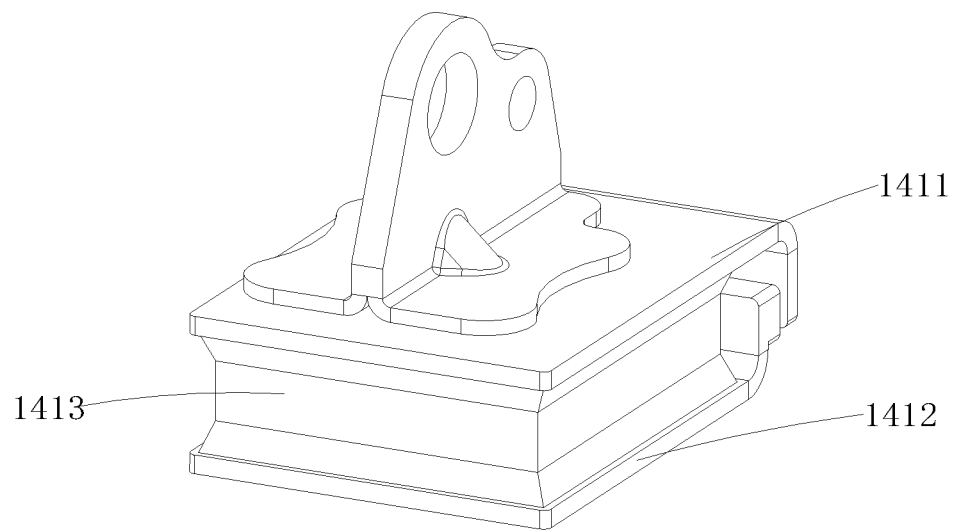
FIG. 14 is a schematic view of the structure of the shock absorber in FIG. 5.
Figure 15:
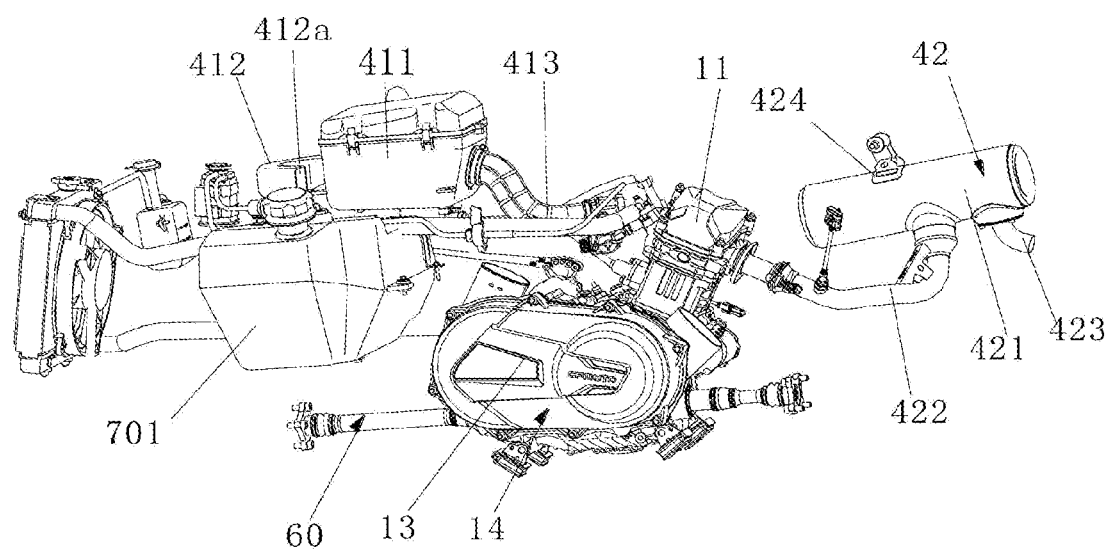
FIG. 15 is a perspective view of the engine, fuel system and intake and exhaust systems in FIG. 6.
Figure 16:
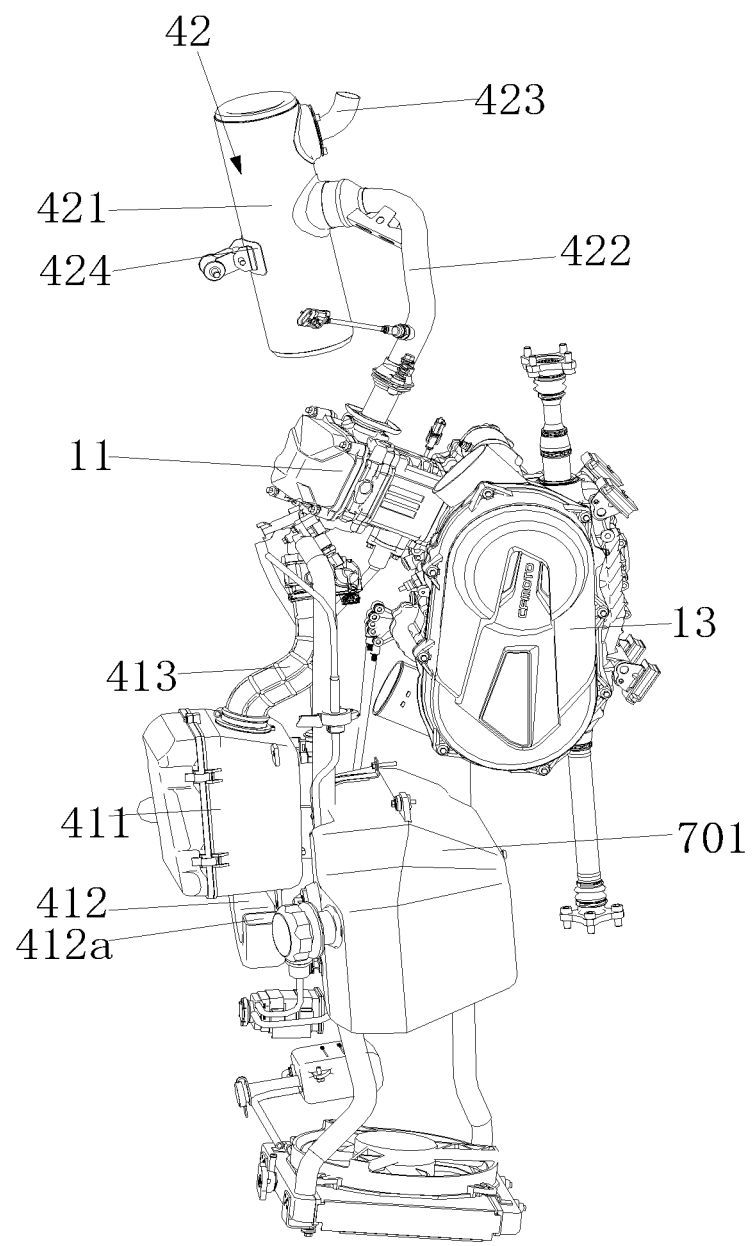
FIG. 16 is a perspective view of the engine, fuel system, and intake and exhaust system in FIG. 6 from another angle.
Figure 17:
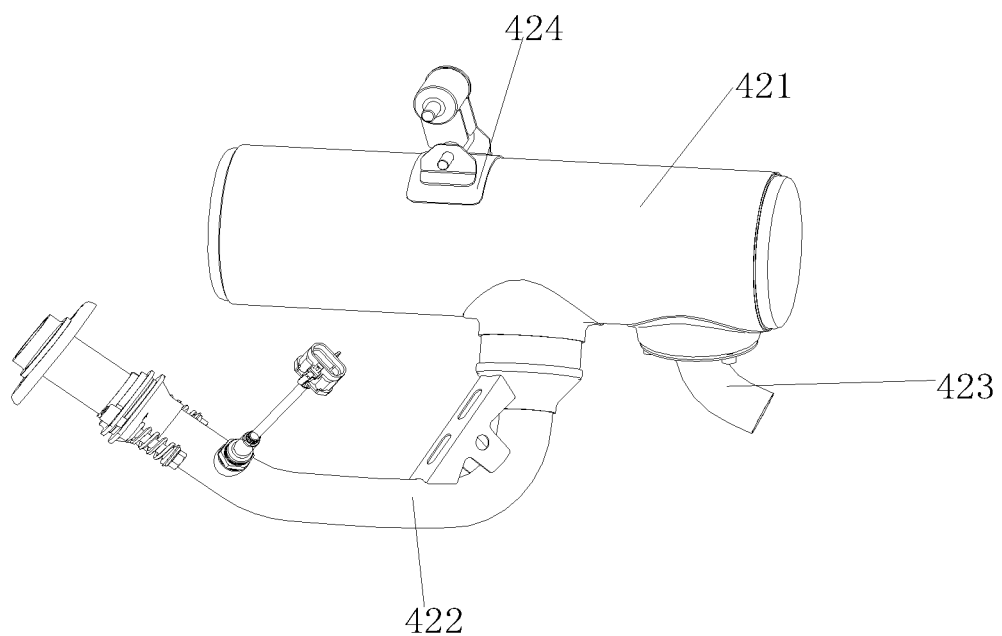
FIG. 17 is a schematic diagram of the structure of the tubular muffler in FIG. 21.
Figure 18:
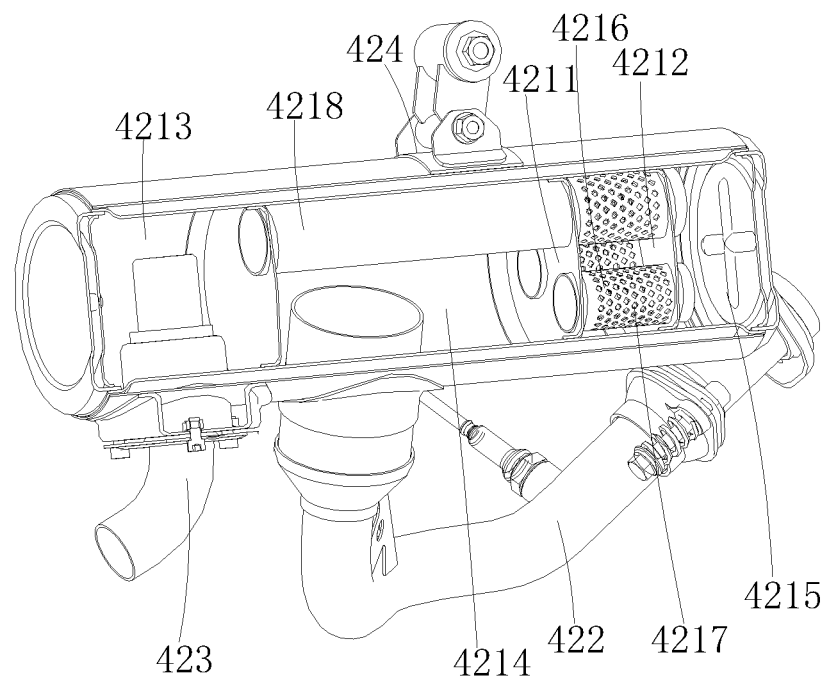
FIG. 18 is a partial cross-sectional view of the tubular muffler in FIG. 21.
Figure 19:
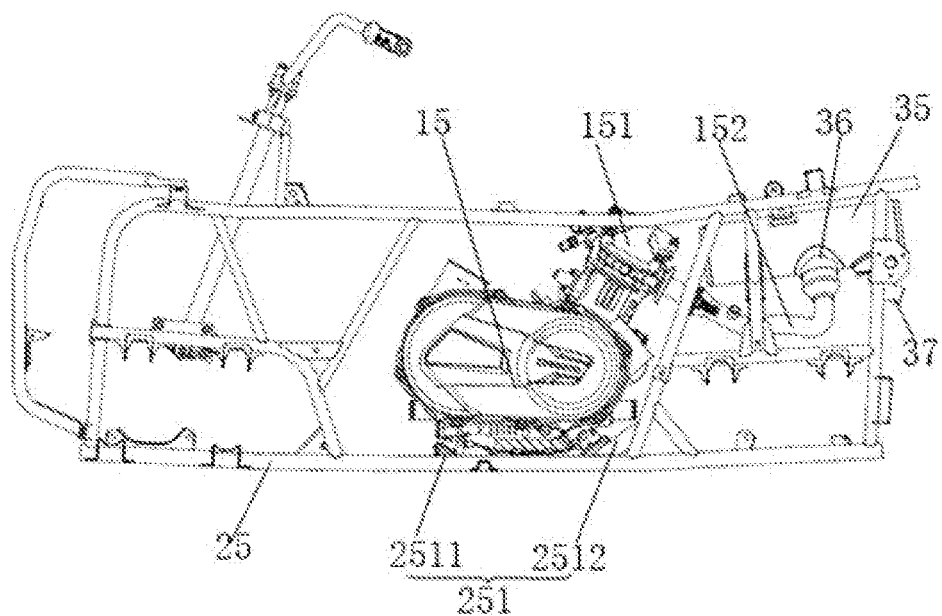
FIG. 19 is a schematic front view of an engine arrangement structure of a straddle-type vehicle provided in an embodiment of the present application.
Figure 20:
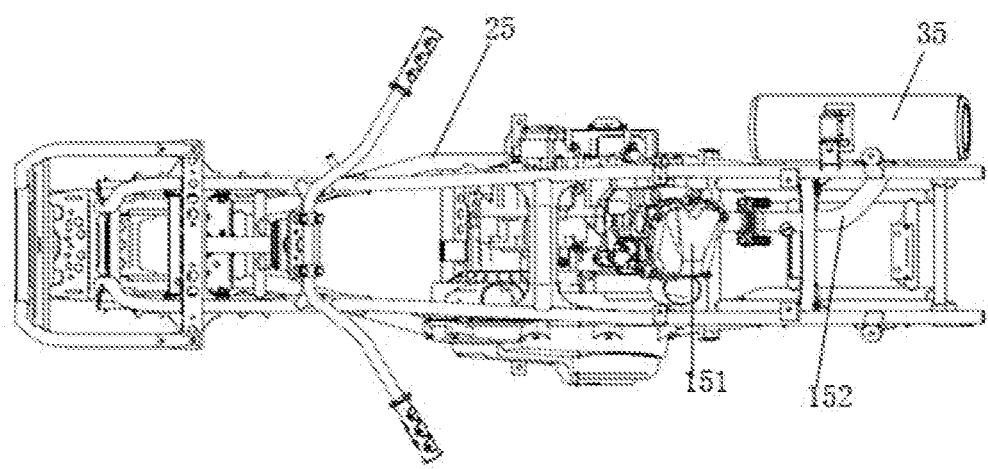
FIG. 20 is a top schematic view of the engine arrangement structure of a straddle-type vehicle provided by an embodiment of the present application.
Figure 21:
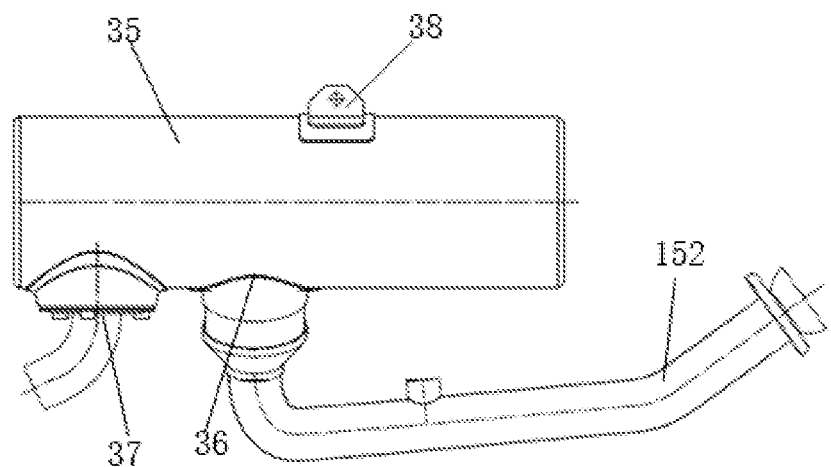
FIG. 21 is a side schematic view of the tubular muffler provided by an embodiment of the present application.
Figure 22:
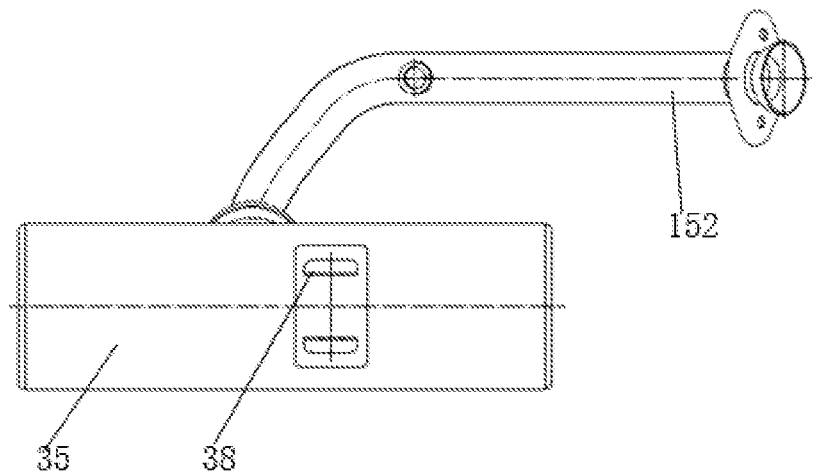
FIG. 22 is a top schematic view of the tubular muffler provided by an embodiment of the present application.

As shown in FIGS. 11-12, the electrical system 90 includes a battery 91 for providing power for ignition of the engine 10 as well as other electrical elements of the vehicle. The battery 91 is located at the front lower portion of the frame 20 and is close to the engine 10. The battery 91 is located on the side away from the transmission 13, so that the heat of the transmission 13 is not transmitted to the battery 91, which lowers the working temperature of the battery 91, increases the working life of the battery 91, and eliminates the potential safety hazard of the battery 91 exploding due to overheating. In particular, a battery mounting position is provided on the frame 20, which includes a battery support plate 203 fixed on the frame 20. The battery support plate 203 is located at the lower portion of the frame 20 and on the side away from the transmission 13. The battery 91 is placed on the battery support plate 203. The edges of the battery support plate 203 are upturned to form a flange 2031 such that battery movement is limited by the flange 2031. The flange 2031 enables heat dissipation from the battery 91 and ensures the battery 91 is stable and is not easily moved. The center of the battery support plate 203 can additionally define a heat dissipation hole 2032 to increase the heat dissipation of the battery 91 and keep the battery 91 working at normal temperature.

Figure 2:
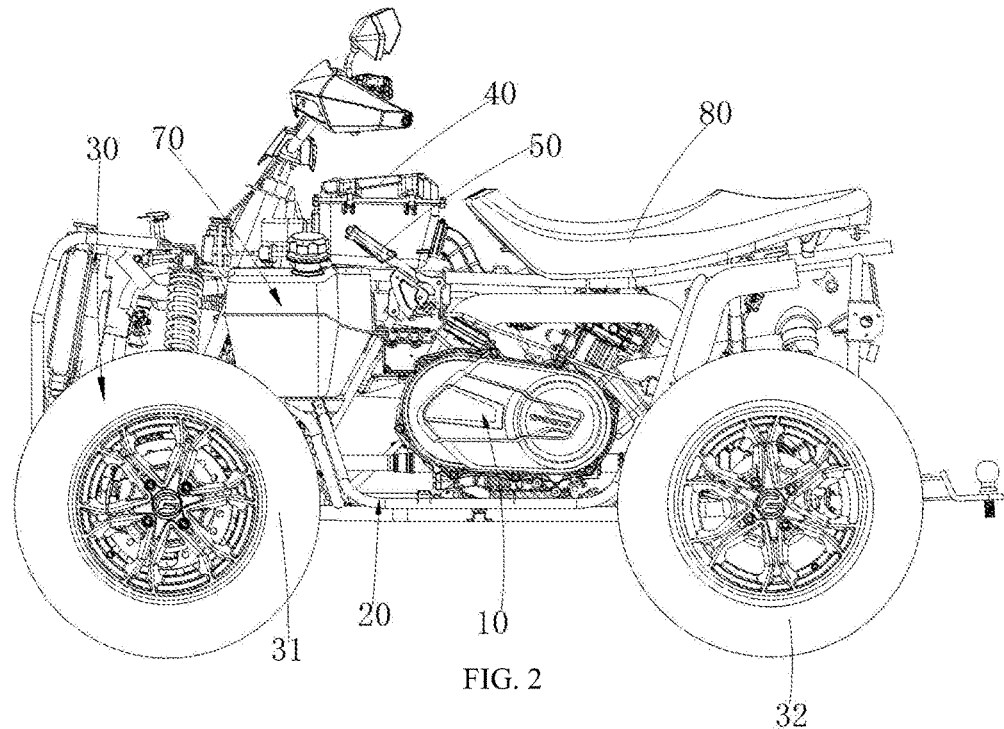
FIG. 2 is a right side view of the straddle-type vehicle in FIG. 1.

As shown in FIGS. 1-2, the brake system 50 includes a parking assembly or assembly 51 to prevent the vehicle 100 from moving after the vehicle 100 has been parked. The parking assembly 51 includes a parking mechanism 511, a handbrake cable 512 and a handle 513. One end of the handbrake cable 512 is connected to the parking mechanism 511, and the other end is connected to the handle 513. By pulling the handle 513, the force on the handle 513 is transmitted to the parking mechanism 511 through the handbrake cable 512, thereby engaging a parking brake for the vehicle 100. In particular, one end of the handle 513 is indirectly and rotatably connected to one side of the frame 20. When using the handle 513, only one end of the handle 513 needs to be pulled so that the handle can be rotated to a certain angle. The handle 513 is arranged on one side of the fuel tank 701 of the vehicle 100 and is close to the front end of the saddle seat 80, a position which is convenient and easy for pulling the handle 513, saving time and effort. A shift lever 601 is indirectly arranged on the frame 20 and close to the front end of the saddle seat 80. The position of the shift lever 601 corresponds to the position of the handle 513, that is, the shift lever 601 is arranged on one side of the frame, and the handle 513 is arranged on the other side of the frame, which is convenient for manual gear shifting when driving the vehicle.

Figure 3:
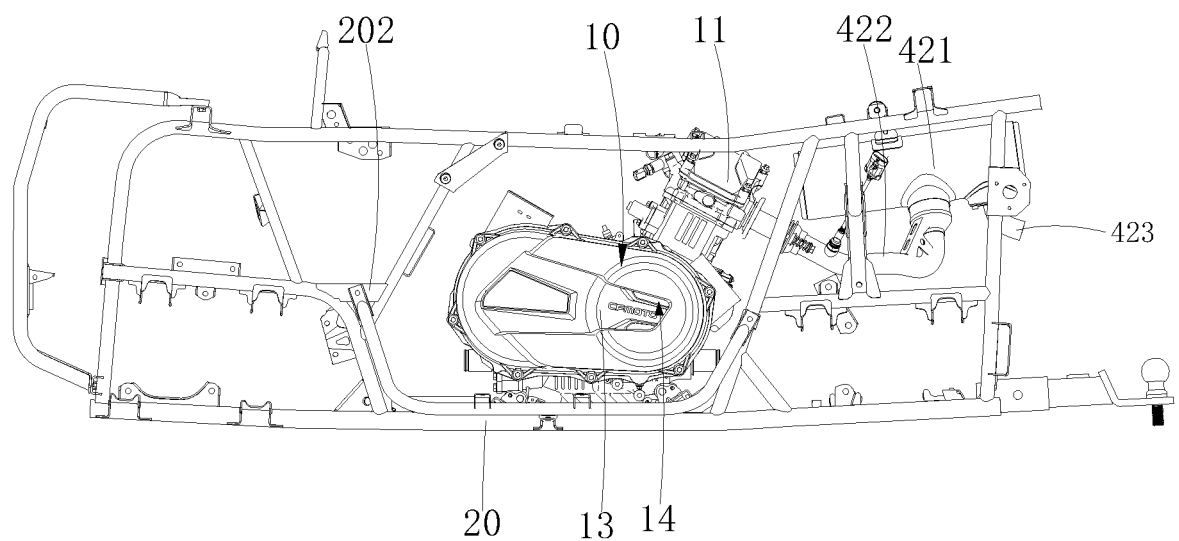
FIG. 3 is a right side view of the engine and exhaust assemblies of the straddle-type vehicle in FIG. 1 on the frame.
Figure 4:
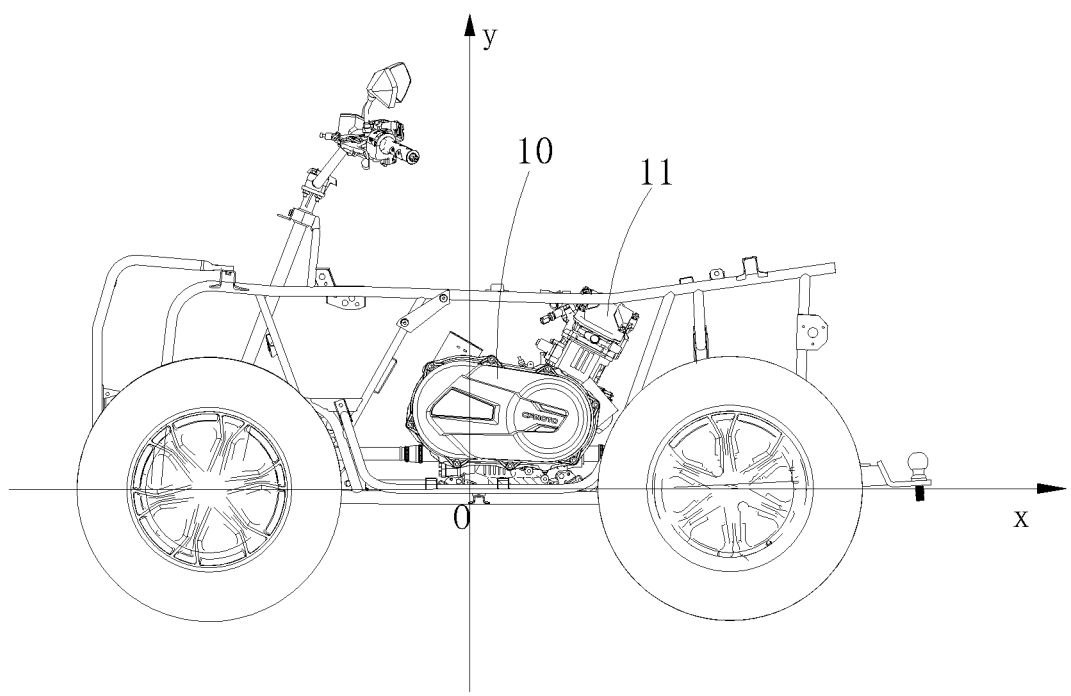
FIG. 4 is a plan view of the cylinder head in FIG. 1 projected on a Cartesian coordinate system x-y.
Figure 5:
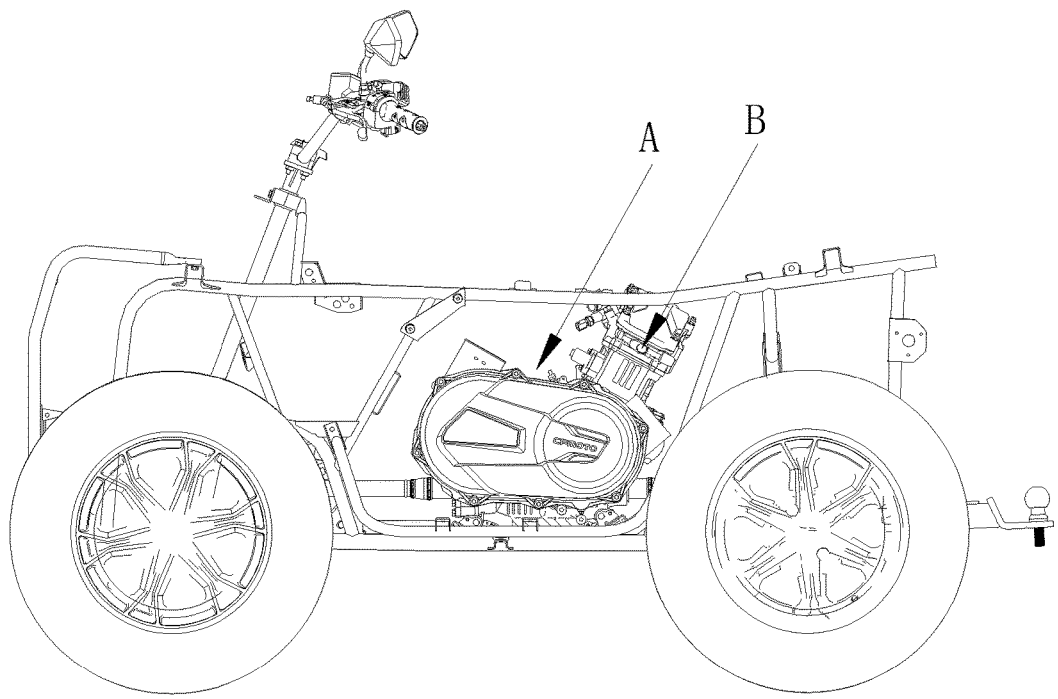
FIG. 5 is a right side view of the engine in FIG. 1 on the frame.

As shown in FIGS. 1-3 and 5, point A is the center of gravity of the vehicle 100, and point B is the center of gravity of the engine 10. The projection of point A on the plane of the Cartesian coordinate system x-y is located on the front side of the projection of point B on the plane of the Cartesian coordinate system x-y, that is, the horizontal distance between point B and the axle center of the rear wheels 32 is less than the horizontal distance between point A and the axle center of the rear wheels 32. FIGS. 3 and 5 show only portions of the preferred embodiment, which are understood to include structures identical or similar to those of other Figures, the description of which is not repeated here.

Figure 8:
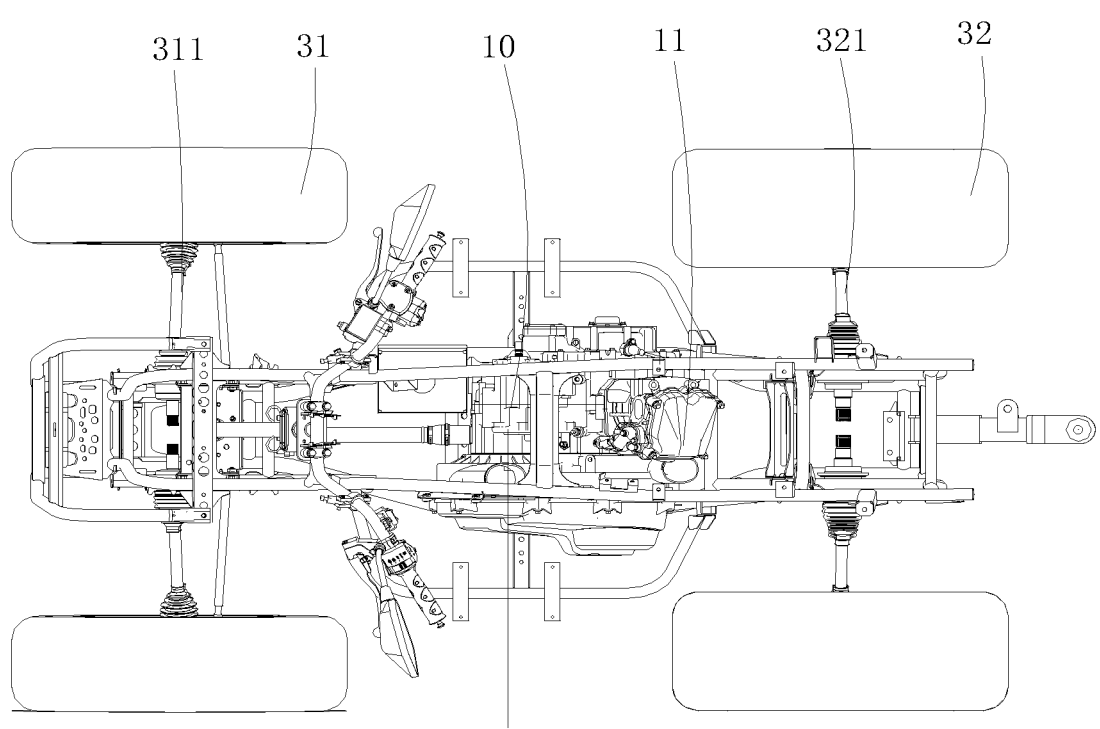
FIG. 8 is a top view of the engine in FIG. 1 on the frame.

As shown in FIGS. 1-3 and 8, a distance between a center of the cylinder head 11 of the engine 10 and the front axle 311 is $L_e$, and a distance between a center of the cylinder head 11 and the rear axle 321 is $L_f$, wherein, $L_e \geq L_f$, and more preferably $L_e \geq 2L_f$. FIGS. 3 and 8 show only portions of the preferred embodiment, which are understood to include structures identical or similar to those of other Figures, the description of which is not repeated here.

Figure 6:
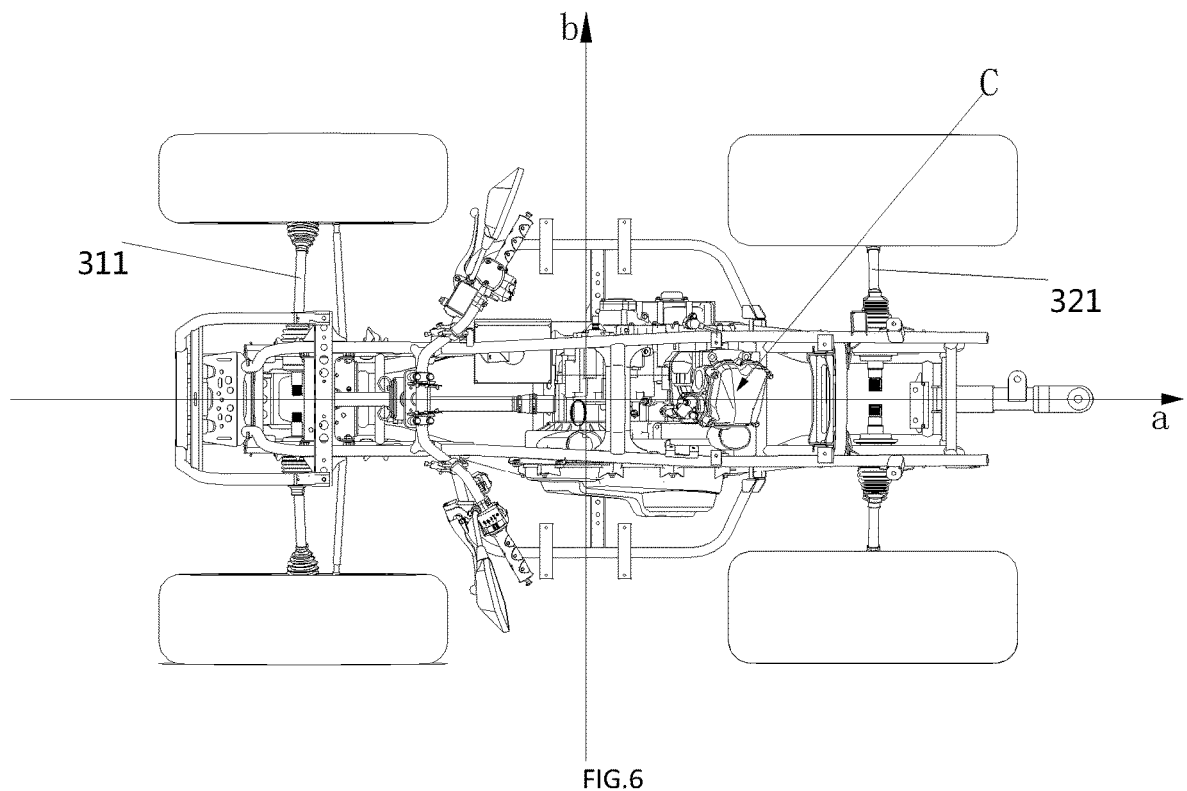
FIG. 6 is a plan view of the cylinder head in FIG. 1 projected on a Cartesian coordinate system a-b.
Figure 7:
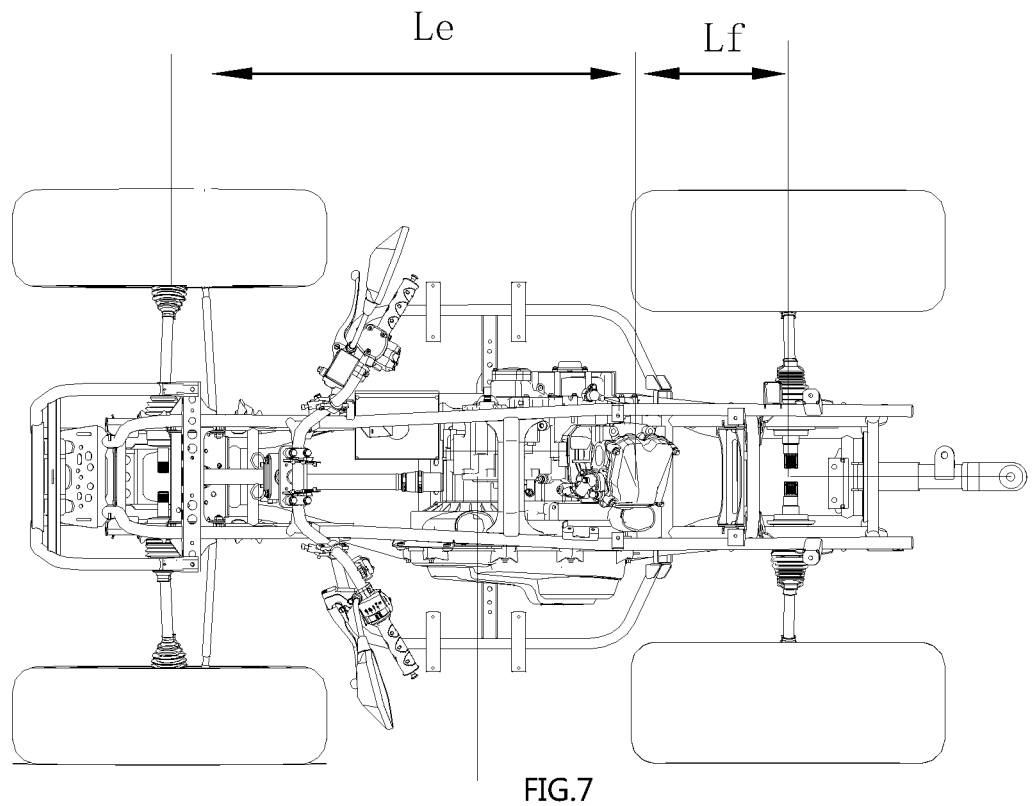
FIG. 7 is a plan view of the horizontal distance between the cylinder head and the front axle of vehicle and of the horizontal distance between the cylinder head and the rear axle of the vehicle in FIG. 1.

As shown in FIGS. 1-3 and 6, the Cartesian coordinate system a-b is established on a plane of imaginary lines connecting the centers of the two front wheels 31 and the centers of the two rear wheels 32 of the vehicle 100, wherein, axis a is the horizontal axis of the Cartesian coordinate system a-b, axis b is the vertical axis as drawn, and the origin is the intersection point. The projection of the wheelbase centerline along the length direction of the vehicle 100 on the plane of the Cartesian coordinate system coincides with axis a, and the projection of the vehicle centerline along the width direction of the vehicle on the plane of the Cartesian coordinate system a-b coincides with the axis b. The projection of the midpoint c of the cylinder head 11 on the plane of the Cartesian coordinate system a-b is located in the first quadrant of the Cartesian coordinate system a-b above the wheelbase centerline. FIGS. 3 and 6 show only portions of the preferred embodiment, which are understood to include structures identical or similar to those of other Figures, the description of which is not repeated here.

As shown in FIGS. 1-3 and 9, the opening direction of the exhaust port on the cylinder head 11 faces toward the tubular muffler 421. FIGS. 3 and 9 show only portions of the preferred embodiment, which are understood to include structures identical or similar to those of other Figures, the description of which is not repeated here.

As shown in FIGS. 1-5 and 19-23, the present embodiment of the invention provides an engine arrangement structure for a straddle-type vehicle, including a frame 25 and an engine 15 fixed on the frame 25. The cylinder is slanted with the cylinder head 151 of the engine 15 is positioned toward the rear of the frame 25. The connection port for connecting the exhaust pipe 152 to the cylinder head 151 faces toward the rear of the frame 25.

By arranging the cylinder head 151 of the engine 15 toward the rear of the frame, and arranging the connection port of the cylinder head 151 to the exhaust pipe 152 facing toward the rear of the frame 25, the exhaust pipe 152 and the tubular muffler 35 need not run the whole length of the vehicle. The exhaust pipe does not pass through the riding position of the driver located in the middle of the frame 25, so the temperature of the riding position of the driver is significantly reduced, and driving comfort is improved.

It should be noted here that for those skilled in this art, straddle-type vehicles are generally provided with single-cylinder engines, and the cylinder head 151 of the single-cylinder engine is connected to an exhaust pipe 152 through which exhaust gas is discharged.

In more preferred embodiments, the cylinder head 151 of the engine 15 is positioned toward the rear end of the frame 25, and the connection port of the cylinder head 151 which connects to the exhaust pipe 152 is also facing rearwardly. These orientations reduce the space available for the muffler. In order to meet the space requirements for the muffler, the muffler is preferably a tubular muffler 35 including an air inlet 36 and an air outlet 37, with the air inlet 36 of the tubular muffler 35 arranged in the middle portion of the circumferential wall of the tubular muffler 35. Thereby, the arrangement space of the muffler can be effectively saved.

In more preferred embodiments, the air outlet 37 of the tubular muffler 35 is arranged at a rear lower end of the circumferential wall of the tubular muffler 35. This arrangement can prevent precipitation from entering the inside of the tubular muffler 35, extending the normal service life of the tubular muffler. Of course, it should be noted that the method of arranging the air outlet 37 at the rear lower end of the circumferential wall of the tubular muffler 35 is only a most preferred embodiment of the present invention. In other embodiments, the air outlet 37 may also be arranged at the rear end face of the tubular muffler 35, or may be arranged at another position according to demand requirements.

Figure 23:
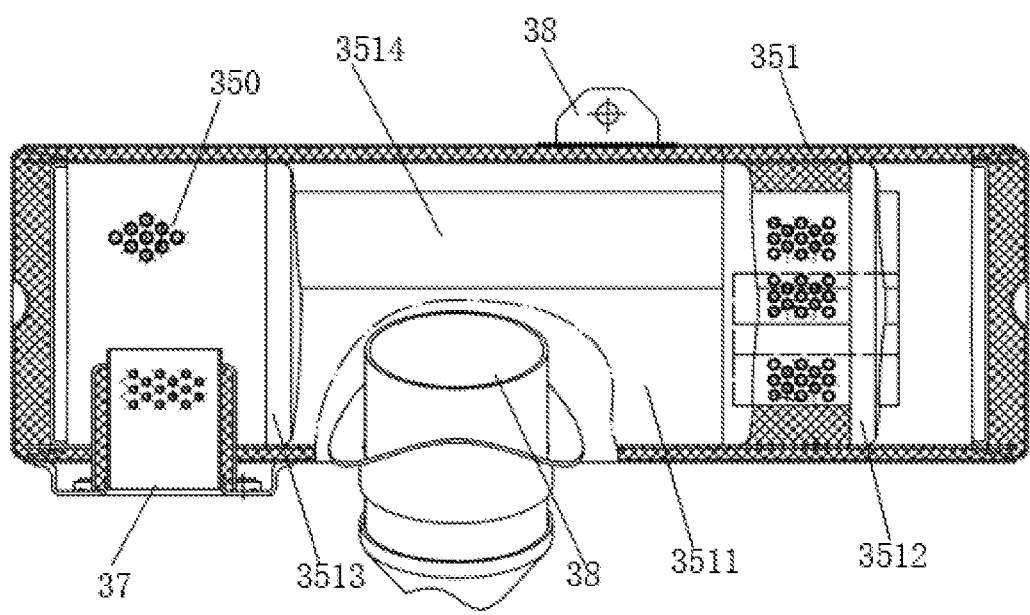
FIG. 23 is a schematic diagram of the internal structure of a tubular muffler provided by an embodiment of the present application.

It should be noted here that, as shown in FIG. 23, the above-discussed tubular muffler 35 includes a tubular body 351, the middle portion of which is provided with an air intake chamber 3511 which is directly connected to the air inlet 36. The tubular muffler 35 includes a front muffling chamber 3512 at the front end of the air intake chamber 3511 and a rear muffling chamber 3513 at the back end of the air intake chamber 3511. The air intake chamber 3511 communicates with the front muffling chamber 3512, the front muffling chamber 3512 communicates with the rear muffling chamber 3513 through a connecting pipe 3514, and the air outlet 37 communicates with the rear muffling chamber 3513. Through this structure of the tubular muffler 35, the exhaust gas path is that the exhaust gas enters into the air intake chamber 3511 from the air inlet port 36, and then flows into the front muffler chamber 3512 for preliminary muffling, and then the exhaust gas in the front muffling chamber 3512 is introduced into the rear muffling chamber 3513 through the connecting pipe 3514 for muffling again, and finally the exhaust gas is discharged through the air outlet 37 connected to the rear muffling chamber 3513. By adopting this structure of the tubular muffler 35, the arrangement space of the muffler can be reduced. The double muffling structure also better enhances the silencing effect of the muffler. It should also be noted that the top of the tubular body of the tubular muffler 35 is generally provided with a mounting position 38 for convenient installation on the vehicle body. The specific structure of the mounting position 38 can adopt a double lifting lug structure, or the other structures commonly used by those skilled in this art and not specified here. A double-layered sandwich structure of sound-absorbing materials is generally arranged on the wall of the tubular body to ensure good silencing effect of the muffler. The structure of the wall of the tubular body may include a double-layer stainless steel plate, the middle of which is filled with sound-absorbing cotton and other sound-absorbing materials. In addition, it should be noted that the inner portions of both the front muffling chamber 3512 and the rear muffling chamber 3513 are generally provided with a porous structure for sound absorption 350, which belongs to the prior art known to those skilled in this field and is not further described in detail here.

In some more specific embodiments, a connection position 251 for fixing the engine 15 is arranged on the frame 25 at a position corresponding to the bottom of the engine 15. Of course, it should be understood that locating the connecting position at the bottom of the engine is only a preferred embodiment of the present invention, and the connecting position can be located elsewhere according to demand requirements.

In a preferred embodiment, the connection position 251 includes a front connection position 2511 arranged nearer to the front end of the frame 25 and a rear connection position 2512 arranged nearer to the rear end of the frame 25. In order to improve the stability of the engine 15 fixed on the frame 25 and avoided the lateral movement of the engine 15 relative to the frame 25, a predetermined inclination angle is defined between the connection plane of the front connection position 2511 and/or the rear connection position 2512 and the bottom plane of engine 15. By setting a predetermined inclination angle, the connecting plane of connection position 251 can support and fix the engine 15 through an inclined plane while laterally limiting the engine 15 relative to the engine frame 25 at the same time, which makes the fixation more stable and reliable.

In a further technical solution, the predetermined inclination angle is generally preferred to be in the range from 15° to 45°. Of course, it can be understood that this is only the preferred example of the specific numerical value for the predetermined inclination angle, and an alternative predetermined angle value can be selected according to demand requirements.

In addition, the present invention also provides a straddle-type vehicle which includes the engine arrangement structure as described in any of the embodiments. As the engine arrangement structure of the above straddle-type vehicle results in the above described technical benefits, a straddle-type vehicle with such an engine arrangement structure also results in the corresponding technical benefits, which will not be repeated here.

The straddle-type vehicle and the arrangement structure of the engine provided by the present invention are described in detail above. It should be noted that each embodiment of the present specification is described in a progressive manner, and each description focuses on differences from the other embodiments. Similar aspects between the various embodiments can be implied by reference to descriptions of other embodiments.

It should also be noted that, in this description, terms such as "including", "containing" or any other variations are intended to be a non-exclusive inclusion, so that items or equipment including a series of elements include not only those elements but also other elements that are not explicitly listed but are inherent to such items or equipment. In the absence of more restrictions, the element modified by the statement "including a" does not exclude such non-listed items or equipment.

All patents and publications referred to in this application specification are publicly available technologies in the field, which may be used to modify the preferred embodiments in this application. All the patents and publications cited in the references could also be used to modify the preferred structures individually referred to herein. The present application can be implemented in the absence of any one or more elements or one or more restrictions which are not specified in the independent claims. The terms and expressions used herein are for description of the most preferred embodiments only, and the invention is not limited by such descriptions of any preferred embodiments, nor is there any intention to indicate that the terms and interpretations described in this application specification exclude any equivalent features. Instead, workers skilled in the art know that any appropriate improvements or modifications may be made within the scope of this application and claims. Understandably, the embodiments described in the present application are some preferred embodiments and features, and any general technical personnel in this art can make some improvements and modifications in accordance with the spirit described in this application. Such improvements and modifications are also deemed to fall into the scopes both of this application and of the limitations of the independent and dependent claims.

What it is claimed is:

1. A straddle-type vehicle comprising:
a frame defining a front end and a rear end, the frame having a lower portion with two longitudinally running lower bars and an upper portion with two longitudinally running upper bars;
a wheel assembly including front and rear wheels arranged for supporting the frame;
an engine mounted on the frame for providing power to the vehicle, which comprises a main body and a cylinder head connected to the main body and positioned above the main body, the two longitudinally running lower bars being adapted to support a bottom of the engine;
an intake and exhaust system, comprising an intake assembly for supplying air to the engine and an exhaust assembly for discharging exhaust gas generated by the engine, the exhaust gas being received into the exhaust assembly through an exhaust port on the cylinder head which is lower than the two longitudinally running upper bars;
a brake system associated with the wheel assembly, comprising a parking component and a brake component;
a transmission system installed on the frame for transmitting power from the engine to the wheel assembly, the transmission system comprising a CVT transmission, the CVT transmission being lower than and extending to a position at least partially beneath or wider than one of the two longitudinally running upper bars;
a fuel system arranged at a front end of the frame for providing fuel to the engine; and
a saddle seat supported on the frame and located above the engine;
wherein, the engine is oriented with its cylinder head positioned toward the rear of the frame; and
wherein a projection of the center of gravity of the vehicle on a vertical plane where side walls of the front and rear wheels on the same side of the vehicle are positioned is located further forward than a projection of the center of gravity of the engine on the vertical plane.

2. The straddle-type vehicle of claim 1, wherein the fuel system comprises:
a fuel tank located toward the front end of the frame; and a projection of a center point of the fuel tank on the vertical plane is located further forward than a projection of the center of gravity of the vehicle on the vertical plane.

3. The straddle-type vehicle of claim 2, wherein the projection of the center point of the fuel tank on the vertical plane is located below a projection of the highest point of the cylinder head on the vertical plane.

4. The straddle-type vehicle of claim 2, wherein the intake assembly comprises:
an air filter;
an air intake pipe connected to the air filter for allowing air to enter into the air filter; and
an air outlet pipe matched with the air filter for filtered air to enter into the cylinder head;
wherein the air filter is located above the fuel tank.

5. The straddle-type vehicle of claim 4, wherein an inlet of the air intake pipe faces toward the rear end of the frame.

6. The straddle-type vehicle of claim 2, wherein the exhaust assembly comprises:
a tubular muffler mounted on the frame, inside of which is a catalyst for promoting redox of exhaust gas; and
an exhaust pipe located between the tubular muffler and the cylinder head, one end of which is connected to a rear side of the cylinder head, and the other end is connected to a middle part of the tubular muffler.

7. The straddle-type vehicle of claim 6, wherein the tubular muffler defines:
a resonance cavity;
an exhaust cavity; and
an air intake cavity arranged between the resonance cavity and the exhaust cavity;
wherein the exhaust pipe is connected to the air intake cavity such that exhaust gas enters into the resonance cavity through the air intake cavity, and then flows into the exhaust cavity through an internal pipe.

8. The straddle-type vehicle of claim 7, wherein a plurality of resonance tubes are provided inside of the resonance cavity, a side wall of each resonance tube defining a plurality of resonance holes for exhaust gas to enter into the resonance cavity.

9. The straddle-type vehicle of claim 7, wherein a portion of the internal pipe located in the resonant cavity defines a plurality of air holes for the exhaust gas to enter into the internal pipe.

10. The straddle-type vehicle of claim 9, wherein the tubular muffler defines a partial pressure chamber adjacent to the resonance cavity, one end of the internal pipe being positioned in the partial pressure chamber, with exhaust gas entering into the internal pipe through a pipe port.

11. The straddle-type vehicle of claim 1, wherein the straddle-type vehicle further comprises:
a battery;
and wherein the frame includes a battery mounting position arranged on the side away from the transmission.

12. The straddle-type vehicle of claim 11, wherein the battery mounting position is a battery support plate arranged at a front lower part of the frame.

13. The straddle-type vehicle of claim 12, wherein the battery support plate defines at least one hole for beat dissipation.

14. The straddle-type vehicle of claim 1, wherein the frame comprises at least two engine mounting positions each extending between the two longitudinally running lower bars for supporting the engine; and wherein a bottom of the main body is provided with at least two shock absorbers each connected to one of the engine mounting positions and inclined relative to horizontal to form an inverted v-shaped support for the engine.

15. The straddle-type vehicle of claim 14, wherein each engine mounting position is a bottom plate arranged between the two longitudinally running lower bars of the frame, and each bottom plate has at least one flat surface.

16. The straddle-type vehicle of claim 14, wherein a cross section of each of the bottom plates defines an inverted v-shaped structure.

17. The straddle-type vehicle of claim 16, wherein each bottom plate defines a plurality of holes.

18. The straddle-type vehicle of claim 1, wherein the parking component comprises:
   a parking mechanism for braking the vehicle while parked;
   a handbrake cable connected to the parking mechanism; and
   a handle, one end of which is hinged to the frame, the handle being connected to the handbrake cable and arranged on one side of the frame.

19. The straddle-type vehicle of claim 1, wherein the exhaust port on the cylinder head faces toward the rear end of the frame.

20. The straddle-type vehicle of claim 19, wherein the exhaust pipe is provided with a tubular muffler comprising an air inlet and an air outlet, and wherein the air inlet is arranged in a middle of a circumferential wall of the tubular muffler.

21. The straddle-type vehicle of claim 20, wherein the air outlet is arranged at a rear lower end of the circumferential wall of the tubular muffler.

22. The straddle-type vehicle of claim 21, wherein the tubular muffler includes a tubular body, a middle portion of the tubular body defines an air intake chamber directly connected to the air inlet, the tubular body defines a front muffling chamber at a front end of the air intake chamber and a rear muffling chamber at a back end of the air intake chamber; the air intake chamber is connected to the front muffling chamber, the front muffling chamber is connected to the rear muffling chamber through an internal connecting pipe, and the air outlet is connected to the rear muffling chamber.

23. The straddle-type vehicle of claim 22, wherein an inner portion of both the front muffling chamber and the rear muffling chamber includes a porous structure for sound absorption.

24. The straddle-type vehicle of claim 19, wherein a connecting position for fixing the engine is arranged on the two longitudinally running lower bars.

25. The straddle-type vehicle of claim 24, wherein the connecting position includes a front connecting position arranged adjacent to the front end of the frame and a rear connecting position arranged adjacent to the rear end of the frame.

26. The straddle-type vehicle of claim 25, wherein a predetermined inclination angle is defined between a connection plane of the front connection position and/or the rear connection position and a bottom plane of the engine.

27. The straddle type vehicle of claim 26, wherein the bottom plane of the engine is horizontal, and wherein the predetermined inclination angle is in a range from 15° to 45° relative to horizontal.

28. The straddle-type vehicle of claim 1, wherein the main body comprises an engine cylinder which is non-vertically slanted with the cylinder head facing toward the rear end of the frame.

29. The straddle-type vehicle of claim 28, wherein a horizontal distance between a center of the cylinder head and a front axle is at least two times a horizontal distance between the center of the cylinder head and a rear axle.

* * * * *